(12) United States Patent
Tamir et al.

(10) Patent No.: US 9,467,512 B2
(45) Date of Patent: Oct. 11, 2016

(54) TECHNIQUES FOR REMOTE CLIENT ACCESS TO A STORAGE MEDIUM COUPLED WITH A SERVER

(71) Applicant: Intel Corporation, Santa Clara, CA (US)

(72) Inventors: Eliezer Tamir, Bait Shemesh (IL); Ben-Zion Friedman, Jerusalem (IL); Phil C. Cayton, Portland, OR (US); Theodore L. Willke, Tacoma, WA (US); Frank Berry, North Plains, OR (US)

(73) Assignee: INTEL CORPORATION, Santa Clara, CA (US)

( * ) Notice: Subject to any disclaimer, the term of this patent is extended or adjusted under 35 U.S.C. 154(b) by 321 days.

(21) Appl. No.: 13/743,170

(22) Filed: Jan. 16, 2013

(65) Prior Publication Data

US 2013/0198312 A1   Aug. 1, 2013

Related U.S. Application Data

(60) Provisional application No. 61/587,541, filed on Jan. 17, 2012.

(51) Int. Cl.
| | |
|---|---|
| *G06F 13/12* | (2006.01) |
| *G06F 15/167* | (2006.01) |
| *H04L 29/08* | (2006.01) |
| *G06F 21/80* | (2013.01) |

(Continued)

(52) U.S. Cl.
CPC ......... *H04L 67/1097* (2013.01); *G06F 3/0611* (2013.01); *G06F 3/0659* (2013.01); *G06F 3/0683* (2013.01); *G06F 15/167* (2013.01); *G06F 21/44* (2013.01); *G06F 21/79* (2013.01); *G06F 21/80* (2013.01); *H04L 69/12* (2013.01)

(58) Field of Classification Search
CPC . H04L 67/1097; H04L 69/12; G06F 15/167; G06F 3/0659; G06F 3/0611; G06F 3/0683; G06F 21/79; G06F 21/80; G06F 21/44
See application file for complete search history.

(56) References Cited

U.S. PATENT DOCUMENTS

| | | | |
|---|---|---|---|
| 7,711,835 B2 | 5/2010 | Braddy et al. | |
| 7,756,943 B1 | 7/2010 | Wong | |

(Continued)

OTHER PUBLICATIONS

"NVM Express—The interface Standard for PCI Express SSDs" by Kevin Marks and Peter Onufryk, Flash Memory Summit 2011.*

(Continued)

*Primary Examiner* — Jing-Yih Shyu

(57) ABSTRACT

Examples include client access to a storage medium coupled with a server. A network input/output device for the server receives a remote direct memory access (RDMA) command including a steering tag (S-Tag) from a client remote to the server. For these examples, the network input/output device forwards the RDMA command to a Non-Volatile Memory Express (NVMe) controller and access is provided to a storage medium based on an allocation scheme that assigned the S-Tag to the storage medium. In some other examples, an NVMe controller generates a memory mapping of one or more storage devices controlled by the NVMe controller to addresses for a base address register (BAR) on a Peripheral Component Interconnect Express (PCIe) bus. PCIe memory access commands received by the NVMe controller are translated based on the memory mapping to provide access to the storage device.

22 Claims, 14 Drawing Sheets

System 600

(51) Int. Cl.
*G06F 21/44* (2013.01)
*G06F 21/79* (2013.01)
*H04L 29/06* (2006.01)
*G06F 3/06* (2006.01)

(56) References Cited

U.S. PATENT DOCUMENTS

| | | | |
|---|---|---|---|
| 7,895,286 B1 | 2/2011 | Kilbourne et al. | |
| 7,921,177 B2 | 4/2011 | Raisch et al. | |
| 8,463,881 B1* | 6/2013 | Baker et al. | 709/220 |
| 8,554,968 B1* | 10/2013 | Onufryk et al. | 710/260 |
| 8,560,693 B1 | 10/2013 | Wang et al. | |
| 8,588,228 B1* | 11/2013 | Onufryk et al. | 370/389 |
| 2004/0205253 A1 | 10/2004 | Arndt et al. | |
| 2006/0074837 A1 | 4/2006 | Braddy et al. | |
| 2009/0024714 A1 | 1/2009 | Raisch et al. | |
| 2009/0292861 A1* | 11/2009 | Kanevsky et al. | 711/103 |
| 2010/0083247 A1* | 4/2010 | Kanevsky et al. | 718/1 |
| 2011/0246597 A1* | 10/2011 | Swanson et al. | 709/212 |
| 2014/0181365 A1 | 6/2014 | Fanning et al. | |

OTHER PUBLICATIONS

"IDF-2012-NVM-Express-and-the-PCI-Express-SSD-Revolution" by Danny Cobb and Amber Huffman, IDF 2012.*
"NVMe and PCIe SSDs NVMe Management Interface" by Peter Onufryk and Austin Bolen, Flash Memory Summit 2014.*
Office Action received for U.S. Appl. No. 13/997,996, mailed Oct. 6, 2014, 18 pages.
International Search Report and Written Opinion received for PCT Patent Application No. PCT/US2013/021759, mailed Apr. 23, 2013, 9 pages.
Office Action received for U.S. Appl. No. 13/997,996 mailed Dec. 4, 2015, 15 pages.
Office Action received for Chinese Patent Application No. 201380005847.2, mailed Mar. 23, 2016, 8 pages(untranslated).

* cited by examiner

Allocation Table 400

| Client | S-Tag | Assigned Storage Medium Capacity (LBA) |
|---|---|---|
| 310-1 | 410-1 | LBA 405-1 |
| 310-1 | 410-2 | LBA 405-2 |
| 310-1 | 410-3 | LBA 405-3 |
| 310-1 | 410-n | LBA 405-n |
| 310-2 | 420-1 | LBA 415-1 |
| 310-2 | 420-2 | LBA 415-2 |
| 310-2 | 420-3 | LBA 415-3 |
| 310-2 | 420-n | LBA 415-n |
| 310-3 | 430-1 | LBA 425-1 |
| 310-3 | 430-2 | LBA 425-2 |
| 310-3 | 430-3 | LBA 425-3 |
| 310-3 | 430-n | LBA 425-n |
| 310-n | 440-1 | LBA 435-1 |
| 310-n | 440-2 | LBA 435-2 |
| 310-n | 440-3 | LBA 435-3 |
| 310-n | 440-n | LBA 435-n |

FIG. 4

Association Scheme 500

| Policy | Metric | Storage Medium Association |
|---|---|---|
| Usage Pattern | Frequency of Access | High – use cache or system memory<br>Medium – use SSD<br>Low – use HHD |
| Quality of Service | Transaction Latency | High or no requirement – use HHD<br>Medium – use SSD<br>Low – use cache or system memory |
| Load Balancing | Storage Mediums in Use | Depends on portion of capacity for a given storage medium. Higher portion = higher number of S-Tag associations, provided other policies are met |
| Wear Leveling | Number of Accesses | Applicable to non-volatile memories (SSD, some system memory):<br>If number of accesses to a given non-volatile memory exceed a threshold reduce or do not associated S-Tags with the given non-volatile memory |

*FIG. 5*

BAR Mapping Table 700

| Memory Mapping to BAR Addresses | Storage Device |
|---|---|
| LBA 675-1 | LBA 672-1 |
| LBA 675-2 | LBA 672-2 |
| LBA 675-3 | LBA 672-3 |
| LBA 675-4 | LBA 672-n |
| LBA 675-5 | LBA 674-1 |
| LBA 675-6 | LBA 674-2 |
| LBA 675-7 | LBA 674-3 |
| LBA 675-8 | LBA 674-n |

RECEIVE AN RDMA COMMAND INCLUDING AN S-TAG FOR A CLIENT REMOTE TO A SERVER TO ACCESS A STORAGE MEDIUM FROM AMONG A PLURALITY OF STORAGE MEDIUMS COUPLED WITH THE SERVER TO INCLUDE A NON-VOLATILE MEMORY STORAGE MEDIUM AND A VOLATILE MEMORY STORAGE MEDIUM
1002

FORWARD THE RDMA COMMAND TO AN NVMe CONTROLLER MAINTAINED AT THE SERVER FOR THE NVMe CONTROLLER TO PROVIDE ACCESS TO THE STORAGE MEDIUM BASED, AT LEAST IN PART, ON AN ASSOCIATION SCHEME THAT ASSOCIATES THE S-TAG INCLUDED IN THE RDMA COMMAND TO THE STORAGE MEDIUM
1004

RECEIVE A COMMAND COMPLETION MESSAGE FROM THE NVMe AND FORWARD A STATUS OF COMPLETION OF THE RDMA COMMAND TO THE CLIENT BASED ON THE COMMAND COMPLETION MESSAGE
1006

GENERATE, AT AN NVMe MAINTAINED AT A SERVER, A MEMORY MAPPING OF ONE OR MORE STORAGE DEVICES CONTROLLED BY THE NVMe CONTROLLER TO ADDRESSES FOR A BAR ACCESSIBLE VIA A PCIe BUS BETWEEN AN NVMe CONTROLLER AND A NW I/O DEVICE COUPLED TO THE SERVER
1402

FORWARD INFORMATION ASSOCIATED WITH THE MEMORY MAPPING TO A CLIENT REMOTE TO THE SERVER VIA THE NW I/O DEVICE
1404

RECEIVE A PCIe MEMORY ACCESS COMMAND FORWARDED FROM THE NW I/O DEVICE AND ORIGINATING FROM THE CLIENT, THE PCIe MEMORY ACCESS COMMAND FOR THE CLIENT TO HAVE STORAGE ACCESS TO THE ONE OR MORE STORAGE DEVICES
1406

TRANSLATE THE PCIe MEMORY ACCESS COMMAND BASED ON THE MEMORY MAPPING TO PROVIDE THE CLIENT STORAGE ACCESS TO THE ONE OR MORE STORAGE DEVICES
1408

FIG. 14

Storage Medium 1500

*Computer Executable Instructions for 1400*

FIG. 15

NVMe Controller 1600

Processing Component 1640

Apparatus 1300

Storage Medium 1500

Other Platform Components 1650

Communications Interface 1660

TECHNIQUES FOR REMOTE CLIENT ACCESS TO A STORAGE MEDIUM COUPLED WITH A SERVER

RELATED CASE

This application claims priority to U.S. Provisional Patent Application No. 61/587,541, filed on Jan. 17, 2012.

BACKGROUND

In an example conventional computing arrangement, a client and a server include respective network interface controllers (NICs) or network (NW) input/output (I/O) devices that are capable of communicating with each other using a Remote Direct Memory Access (RDMA) protocol. The server includes a host processor that executes the server's operating system and associated drivers. The server may also include a storage controller that manages access to storage maintained at or by the server. The client's NW I/O device issues requests to the server's NW I/O device to write data to and read data from the storage maintained by the server. The server's operating system, associated drivers, and host processor process the requests received by the server's NW I/O device, and issues corresponding requests to the storage controller. The storage controller receives and executes these corresponding requests. After executing the corresponding requests, the storage controller issues request completion information (and associated data if data has been read from the storage) to the server's operating system and associated drivers. From this, the server's operating system, associated drivers, and host processor generate corresponding request completion information and associated data, and issue the corresponding request completion information and associated data to the server's NW I/O device. The server's NW I/O device then issues the corresponding request completion information and associated data to the client's NW I/O device.

Thus, in the foregoing conventional arrangement, the server's operating system, associated drivers, and host processor process requests received by the server's NW I/O device, and the completion information and data from the storage. This may consume substantial amounts of operating system and host processor processing capacity. It may also increase the amount of energy consumed and heat dissipated by the host processor. Furthermore, it may increase the latency involved in processing the requests issued by the client's NW I/O device.

BRIEF DESCRIPTION OF THE DRAWINGS

FIG. 4 illustrates an example allocation table.
FIG. 5 illustrates an example association scheme.
FIG. 7 illustrates an example base address register (BAR) mapping table.
FIG. 10 illustrates an example of a first logic flow.
FIG. 14 illustrates an example of a second logic flow.
FIG. 15 illustrates an example of a second storage medium.
FIG. 16 illustrates an example Non-Volatile Memory Express (NVMe) controller.

DETAILED DESCRIPTION

Figure 1:
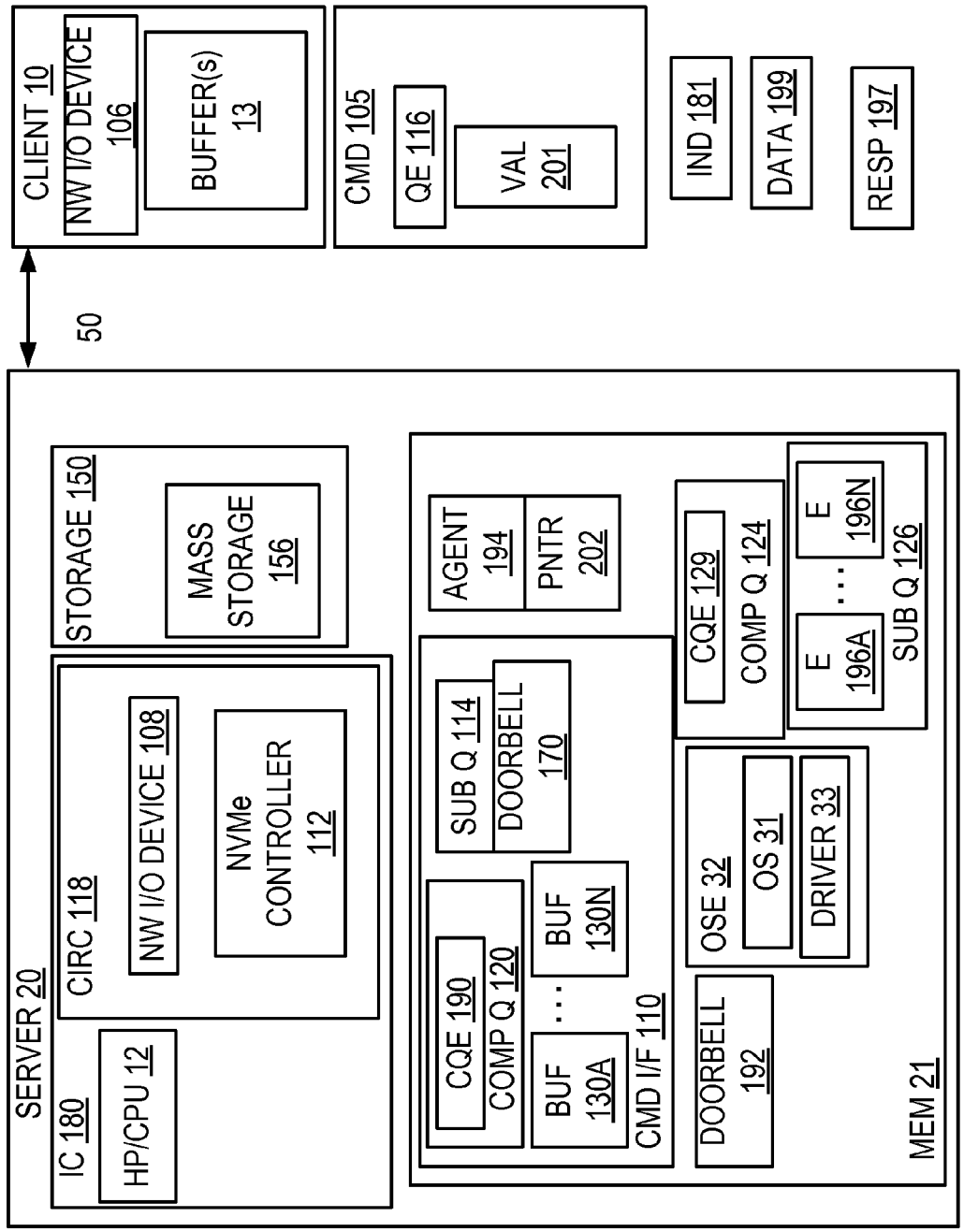
FIG. 1 illustrates a first example system.

As contemplated in the present disclosure, substantial amounts of operating system and host processor processing capacity may be consumed in a conventional arrangement between a client and a server when the client attempts to access storage maintained by the server. Recently, servers are including both NW I/O devices and storage controllers having enhanced capabilities that try to minimize operating system and host processor involvement. For example, hardware elements such as command submission and command completion queues may be utilized by a server's NW I/O device and storage controllers to enable a remote client to access storage via a process known as remote direct memory access (RDMA).

Storage controllers are also being designed to operate in compliance with relatively new interconnect communication protocols that may work well with RDMA. Further, these storage controllers may control access to various types of storage mediums to include hard disk drives (HDDs) or solid state drives (SSDs). The SSDs may include, but are not limited to, various types of non-volatile memory such as 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM). In some examples, access to HDDs or SSDs may include use of interconnect communication protocols described in industry standards or specifications (including progenies or variants) such as the Peripheral Component Interconnect (PCI) Express Base Specification, revision 3.0, published in November 2010 ("PCI Express" or "PCIe") and/or the Non-Volatile Memory Express (NVMe) Specification, revision 1.1, published in October 2012.

Storage controllers that operate in compliance with the NVMe Specification ("NVMe controllers") may be capable of minimizing operating system and host processor involvement when allowing a remote client to access storage such as an SSD or an HDD. These types of NVMe controllers may not have built-in security checks to control access to the SSD or HDD in a client/server environment to protect the client from a harmful actor posing as another client. In some deployment, intimate knowledge of the design details of the storage controller may be needed by manufacturers of NW I/O devices in order to set-up and then maintain communications with little to no operating system and host processor involvement. However, this may lead to some inflexibility to interchange devices from a host computing platform. Also, operators may be limited to utilize NW I/O devices and NVMe controllers that were made by the same manufacturer that has the intimate knowledge needed for these types of deployments. Since NW I/O devices and NVMe controllers may be separately made by disparate types of manufactures (e.g., ones focused on network communications and others focused on storage communications) or manufacturers that comply with different specifications or versions thereof, the number of manufacturers making both types of devices or operating in compliance with similar specifications may be limited.

Rather than require such detail of co-design, circuitry for either a NW I/O device and/or for an NVMe controller may be capable of implementing techniques that may not require such knowledge of design details. These techniques may use some aspects of either RDMA such as use of steering tags (S-Tags) to facilitate access to a plurality of storage mediums coupled to a server by a remote client. The techniques may also use some aspects of the PCIe and/or NVMe Specifications such as addresses for a base address register (BAR) to facilitate access for a remote client to storage devices controlled by an NVMe controller. Both techniques may seek to flatten storage addressing schemes using RDMA. It is with respect to these and other challenges that the examples described herein are needed.

In some examples, techniques associated with remote client access to a storage medium coupled with a server may be implemented. For these examples, circuitry for a NW I/O device coupled to the server may be capable of receiving an RDMA command including an S-Tag. The RDMA command may be for a client remote to the server to access a storage medium from among a plurality of storage mediums coupled with the server to include a non-volatile memory storage medium and a volatile memory storage medium. The circuitry may also be capable of forwarding the RDMA command to an NVMe controller maintained at the server. The NVMe controller may then provide access to the storage medium based, at least in part, on an association scheme that associates the S-Tag included in the RDMA command to the storage medium.

In some other examples, techniques associated with remote client access to storage devices controlled by an NVMe controller maintained at a server. For these examples, circuitry for the NVMe controller may be capable of generating a memory mapping of the storage devices to addresses for a base address register (BAR) accessible via a PCIe bus between the NVMe controller and a NW I/O device coupled to the server. The circuitry may also be capable of forwarding information associated with the memory mapping to a client remote to the server via the NW I/O device. The circuitry may also be capable of receiving a PCIe memory access command forwarded from the NW I/O device and originating from the client. The received PCIe memory access command may be for the client to have storage access to the one or more storage devices. The circuitry may also be capable of translating the PCIe memory access command based on the memory mapping to provide the client storage access to the one or more storage devices.

FIG. 1 illustrates an example a first example system. As shown in FIG. 1 the first example system includes a system 100 having a client 10 that is communicatively coupled, via network 50, to server 20. According to some examples, the terms "host computer," "host," "server," "client," "network node," and "node" may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. Although client 10, server 20, and network 50 will be referred to in the singular, it should be understood that each such respective component may comprise a plurality of such respective components without departing from these examples. According to some examples, a "network" may be or comprise any mechanism, instrumentality, modality, and/or portion thereof that permits, facilitates, and/or allows, at least in part, two or more entities to be communicatively coupled together. Also in some examples, a first entity may be "communicatively coupled" to a second entity if the first entity is capable of transmitting to and/or receiving from the second entity one or more commands and/or data. Also, data and information may be used interchangeably, and may be or comprise one or more commands (for example one or more program instructions), and/or one or more such commands may be or comprise data and/or information. Also for these examples, an "instruction" may include data and/or one or more commands.

Client 10 may include remote direct memory access (RDMA)-enabled network interface controller (RNIC) herein referred to as network (NW) I/O device 106 and/or one or more (and in the example shown in FIG. 1, a plurality of) buffers 13.

As shown in FIG. 1, server 20 may include one or more integrated circuit (IC) chips 180, memory 21, and/or storage 150. One or more chips 180 may have circuitry 118 that may include a NW I/O device 108 or an NVMe controller 112. Although not shown in FIG. 1, in some examples NW I/O device 108 and/or NVMe controller 112 may be separately attachable devices that couple to server 20 and include circuitry as described further below. In some examples, NVMe controller 112 may reside physically on a storage device included in storage 150.

Also as shown in FIG. 1, the one or more chips 180 that may be incorporated within one or more multi-core host processors (HP) and/or central processing units (CPU) 12. Although not shown in the Figures, server 20 also may comprise one or more chipsets or devices to include, but not limited to memory or input/output controller circuitry). NW I/O device 108, NVMe controller 112, and/or HP/CPU 12 may be capable of communicating with each other. Additionally, NW I/O device 108, NVMe controller 112 and/or HP/CPU 12 may be capable of accessing and/or communicating with one or more other components of server 20 (such as, memory 21 and/or storage 150), via one or more such chipsets. In some examples, client 10 and/or NW I/O device 106 may be remote (e.g., geographically remote), at least in part, from server 20 and/or NW I/O device 108.

According to some examples, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also, in some examples, a processor, HP, CPU, processor core (PC), core, and controller each may comprise respective circuitry capable of performing, at least in part, one or more arithmetic and/or logical operations, and/or of executing, at least in part, one or more instructions. An integrated circuit chip may include one or more microelectronic devices, substrates, and/or dies. Although not shown in the FIG. 1, server 20 may have a graphical user interface system that may include, e.g., a respective keyboard, pointing device, and display system that may permit a human user to input commands to, and monitor the operation of, server 20 and/or system 100. Also, memory may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

In some examples, storage 150 may include mass storage 156. For these examples, storage 150 may include one or more devices into, and/or from which, data may be stored and/or retrieved, respectively. Also, for these examples, mass storage may include storage capable of non-volatile storage of data. For example, mass storage 156 may include, without limitation, one or more non-volatile electro-mechanical, magnetic, optical, and/or semiconductor storage devices. These devices may include hard disk drives (HDDs) or solid state drives (SSDs). The SSDs may have non-volatile types of memory such as 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

According to some examples NVMe controller 112, storage 150 or mass storage 156 may be capable of operating in compliance with the PCIe Specification and/or the NVMe Specification.

One or more machine-readable program instructions may be stored, at least in part, in memory 21. In operation of server 20, these machine-readable instructions may be accessed and executed by one or more host processors 12, NW I/O device 108, and/or NVMe controller 112. When executed by one or more HP/CPU 12, these one or more machine-readable instructions may result in one or more operating system environments (OSE) 32 being executed at least in part by one or more HP/CPU 12, and becoming resident at least in part in memory 21. Also when these machine-readable instructions are executed by NW I/O device 108 and/or NVMe controller 112, these one or more instructions may result in one or more command interfaces 110 of NVMe controller 112, one or more doorbells 192, one or more pointers 202, one or more agents 194, one or more completion queues 124, and/or one or more submission queues 126 being established and/or executed by NW I/O device 108 and/or NVMe controller 112, and/or becoming resident in memory 21.

According to some examples, one or more OSE 32 may include one or more operating systems (OS) 31 and/or one or more NW I/O device and/or NVMe controller drivers 33. These one or more drivers 33 may be mutually distinct from one or more OS 31, at least in part. Alternatively or additionally, without departing from these examples, one or more respective portions of one or more OS 31 and/or drivers 33 may not be mutually distinct, at least in part, from each other and/or may be included, at least in part, in each other. Likewise, without departing from these examples, circuitry 118, NW I/O device 108, manageability module 109 and/or NVMe controller 112 may be distinct from, or alternatively, may be included in the one or more not shown chipsets and/or HP/CPU 12. Also without departing from these examples, one or more portions of memory 21 may be included in or maintained at NW I/O device 108, manageablilty module 109, NVMe controller 112, circuitry 118, HP/CPU 12, and/or IC 180.

In some examples, a portion or subset of an entity may include all or less than all of the entity. Also, for these examples, a process, thread, daemon, program, driver, operating system, application, kernel, virtual machine, and/or virtual machine monitor each may (1) include, at least in part, and/or (2) result, at least in part, in and/or from, execution of one or more operations and/or program instructions.

According to some examples, a command interface may facilitate, permit, and/or implement, at least in part, exchange, transmission, and/or receipt of data and/or one or more commands. For these examples, a queue, buffer, and/or doorbell may be one or more locations (e.g., specified and/or indicated, at least in part, by one or more addresses) in memory in which data and/or one or more commands may be stored, at least temporarily. Also, a queue element may include data and/or one or more commands to be stored and/or stored in one or more queues, such as, for example, one or more descriptors and/or one or more commands. Additionally, for these examples, a pointer may indicate, address, and/or specify, at least in part, one or more locations and/or one or more items in memory.

In some examples, NW I/O device 106 and NW I/O device 108 may exchange data and/or commands via network 50 in accordance with one or more protocols that may comply and/or be compatible with an RDMA protocol such as Internet Wide Area RDMA protocol (iWARP), Infiniband (TB) protocol, Ethernet protocol, Transmission Control Protocol/Internet Protocol (TCP/IP) protocol and/or RDMA over Converged Ethernet (RoCE) protocol. For example, the iWARP protocol may comply and/or be compatible with Recio et al., "An RDMA Protocol Specification," Internet Draft Specification, Internet Engineering Task Force (IETF), 21 Oct. 2002. Also for example, the Ethernet protocol may comply and/or be compatible with Institute of Electrical and Electronics Engineers, Inc. (IEEE) Std. 802.3-2008, Dec. 26, 2008. Additionally, for example, the TCP/IP protocol may comply and/or be compatible with the protocols described in Internet Engineering Task Force (IETF) Request For Comments (RFC) 791 and 793, published September 1981. Also, the IB protocol may comply and/or be compatible with Infiniband Architecture Specification, Vol. 2, Rel. 1.3, published November 2012. Additionally, for example, the RoCE protocol may comply and/or be compatible with Supplement to Infiniband Architecture Specification, Vol. 1, Rel. 1.2.1, Annex A16: "RDMA over Converged Ethernet (RoCE)", published April 2010. Many different, additional, and/or other protocols may be used for such data and/or command exchange without departing from these examples (e.g., earlier and/or later-developed versions of the aforesaid, related, and/or other protocols).

According to some examples, circuitry 118 may permit and/or facilitate, at least in part, NW I/O device 106's access, via NW I/O device 108, of one or more command interfaces 110. For example, circuitry 118 may permit and/or facilitate, at least in part, NW I/O device 106 being able to so access one or more command interfaces 110 in a manner that is independent of OSE 32 in server 20. This accessing may include, for example, the writing of at least one queue element (e.g., one or more queue elements (QE) 116) to one or more submission queues 114 in one or more command interfaces 110. This may cause NW I/O device 108 to forward commands to NVMe controller 112 to perform, at least in part, one or more operations involving storage 150 and/or mass storage 156 associated with NVMe controller 112. NVMe controller 112 may perform these one or more operations in response, at least in part, to the one or more queue elements 116 (e.g., after and in response, at least in part, to the one or more queue elements 116 being written into one or more submission queues 114 and then forwarded by NW I/O device 108). These one or more operations involving storage 150 and/or mass storage 156 may comprise one or more write operations and/or one or more read operations involving, at least in part, storage 150 and/or mass storage 156. For these examples, client 10 thus may be able to access storage 150 and/or mass storage 156 via the one or more read operations and/or one or more write operations executed by NVMe controller 112.

By way of example, in operation of system 100, client 10 and/or NW I/O device 106 may authenticate client 10 and/or NW I/O device 106 to server 20 and/or logic and/or features at NW I/O device 108. This may result in client 10 and/or NW I/O device 106 being granted permission to access, at least in part, devices maintained at or controlled by elements of server 20 (e.g., via NW I/O device 108). Contemporaneously, after, or prior to this, at least in part, NW I/O device 108, NVMe controller 112, one or more agents 194, and/or OSE 32 may generate, establish, and/or maintain, at least in part, in memory 21, one or more interfaces 110 and/or one or more indicators 181 that may indicate, at least in part, where (e.g., one or more locations) in memory 21 one or more interfaces 110 and/or the components thereof may be located. For example, one or more indicators 181 may indicate, at least in part, one or more locations in memory 21 where one or more submission queues 114, one or more completion queues 120, one or more doorbells 170, and/or one or more buffers 130A . . . 130N may be located. NW I/O device 108 may provide, via network 50, one or more indicators 181 to NW I/O device 106. Thereafter, NW I/O device 106 may use one or more of the one or more indicators 181 to access one or more command interfaces 110 and/or one or more components of the one or more command interfaces 110. One or more indicators 181 may be or comprise, at least in part, one or more handles (e.g., assigned to transaction contexts) for one or more regions in memory 21, such as, in this embodiment, one or more steering tags (STags) or transaction tags (TTags) that may comply and/or may be compatible with an RDMA (e.g., iWARP, IB, RoCE) protocol. In some examples, the one or more regions in memory 21 may be included in one or more bounce buffers maintained to facilitate remote access of storage 150 or mass storage 156 by client 10. The one or more bounce buffers may include a regular host buffer allocated for intermediate storage so that one device (e.g., NW I/O device 108) can forward data to another device (e.g., NVMe controller 112).

After receiving one or more indicators 181, client 10 and/or NW I/O device 106 may issue one or more commands 105 to server 20, via network 50 and NW I/O device 108, to NVMe controller 112 in a manner that by-passes and/or is independent of the involvement of OSE 32. The one or more commands 105 may command NVMe controller 112 to perform one or more operations involving storage 150 and/or mass storage 156.

According to some examples, one or more commands 105 may comply and/or be compatible with an RDMA (e.g., iWARP, IB, RoCE) protocol. One or more commands 105 may include and/or specify, at least in part, one or more queue elements 116 that may embody and/or indicate, at least in part, the one or more operations involving storage 150 and/or mass storage 156 that are being commanded. Although not shown in FIG. 1, one or more commands 105 may comprise, specify, and/or indicate, at least in part, one or more of the indictors 181 that may indicate one or more locations in one or more submission queues 114 as one or more intended destinations of one or more queue elements 116.

In some examples, one or more queue elements 116 may result in NW I/O device 108 forwarding a command to have NVMe controller 112 perform or execute one or more write operations involving storage 150 and/or mass storage 156. Therefore, one or more commands 105 also may include and/or specify, at least in part, data 199 to be written, as a result of NW I/O device 108 forwarding one or more queue elements 116 to NVMe controller 112, to storage 150 and/or mass storage 156. One or more commands 105 may include, specify, and/or indicate, at least in part, one or more of the indicators 181 that may indicate one or more locations of one or more buffers (e.g., buffer(s) 13) to which data 199 is to be written (at least temporarily) to a client 10.

In response, at least in part, to receipt of one or more commands 105, NW I/O device 108 may directly write (e.g., in accordance with RDMA (e.g., iWARP, IB, RoCE) protocol and/or in a manner that by-passes and/or is independent of OSE 32), in the manner commanded by one or more commands 105, one or more queue elements 116 and data 199 to one or more submission queues 114 and one or more buffers 130A, respectively. Thus, in effect, by issuing one or more commands 105 to NW I/O device 108, NW I/O device 106 may write one or more queue elements 116 and data 199 to one or more submission queues 114 and one or more buffers 130A, respectively.

One or more commands 105 also may comprise and/or specify one or more values 201 and one or more of the indicators 181 that may indicate one or more locations of one or more doorbells 170 to which one or more values 201 may be written. In response, at least in part, to these one or more values 201 and these one or more of the indicators 181 in one or more commands 105, NW I/O device 108 may directly write (e.g., in accordance with RDMA (e.g., iWARP, IB, RoCE) protocol and/or in a manner that by-passes and/or is independent of OSE 32), in the manner commanded by one or more commands 105, one or more values 201 in doorbell 170. The writing of one or more values 201 in doorbell 170 may ring doorbell 170. Thus, in effect, by issuing one or more commands 105 to NW I/O device 108, NW I/O device 106 may ring doorbell 170.

According to some examples, the ringing of a doorbell that is associated with an entity may comprise and/or involve, at least in part, the writing one or more values to one or more memory locations (e.g., associated with, comprising, and/or embodying the doorbell) that may result in and/or trigger, at least in part, the entity performing, at least in part, one or more operations and/or actions. In some examples, the doorbells 170 and/or 192 may appear to HP/CPU 12 and/or server 20 as one or more respective memory locations (not shown) in respective memory (not shown) in NVMe controller 112 and/or NW I/O device 108, respectively.

In response, at least in part, to the ringing of doorbell 170, NVMe controller 112 may return to a fully operational state (e.g., if NVMe controller 112 had previously entered a reduced power state relative to this fully operational state), and may receive the one or more queue elements 116 that were written into one or more submission queues 114 (e.g., via RDMA commands with S-Tags or via PCIe memory access commands). NVMe controller 112 may then execute, at least in part, the one or more commands that are specified and/or embodied by one or more queue elements 116. This may result in NVMe controller 112 performing, at least in part, the one or more operations (e.g., one or more writes to storage 150 and/or mass storage 156 of data 199 stored in one or more buffers 130A) involving storage 150 and/or mass storage 156.

After completion, at least in part, of these one or more operations involving storage 150 and/or mass storage 156, NVMe controller 112 may communicate to NW I/O device 108 that the one or more operations were completed. Also after completion, at least in part, of these one or more operations involving storage 150 and/or mass storage 156 or NVMe controller 112 may write, at least in part, one or more values to one or more doorbells 192 associated with NW I/O device 108. This may ring one or more doorbells 192. In response, at least in part, to the ringing of one or more doorbells 192, NW I/O device 108 may write (e.g., via one or more RDMA write operations) one or more completion queue elements 190 to one or more completion queues 120 and then forward the one or more completion queue elements 190 to one or more buffers 13 in client 10 (e.g., via one or more responses 197).

After one or more (e.g., several) such write and/or read operations involving storage 150 and/or mass storage 156 have been performed, at least in part, one or more agents 194 may carry out certain management functions. For example, one or more agents 194 may establish, at least in part, one or more submission queue entries/elements (E) 196A . . . 196N in one or more submission queues 126 associated with NW I/O Device 108 and/or one or more submission queue entries/elements QE A . . . QE N in table 250 (see FIG. 2). As is discussed below, these elements 196A . . . 196N and/or QE A . . . QE N, when executed, at least in part, by NW I/O device 108, may permit and/or facilitate copying or forwarding, at least in part, one or more other queue entries (e.g., one or more NVMe controller 112 completion entries 129) to client 10 and/or NW I/O device 106 and/or data read by NVMe controller 112.

These management functions also may include the updating (e.g., appropriately advancing), at least in part, by one or more agents 194 of one or more pointers (e.g., ring pointers PNTR 202) associated with one or more queue pairs (e.g., submission/completion queue pair 114, 120 and/or submission/completion queue pair 126, 124) associated with the NW I/O device 108 and the NVMe controller 112. This may permit new entries to the queue pairs to be stored at locations that will not result in erroneous overwriting of other entries in the queue pairs. Additionally, as part of these management functions, the one or more agents 194 may indicate one or more of the buffers 130A . . . 130N that may be available to be reused.

As another example, one or more queue elements 116 may command that NVMe controller 112 perform one or more read operations involving storage 150 and/or mass storage 156. Therefore, one or more commands 105 also may include and/or specify, at least in part, one or more locations (e.g., Namespaces or memory mappings to addresses for a BAR) for storage 150 and/or mass storage 156 from which NVMe controller 112 is to read data 199, as a result of executing one or more queue elements 116.

In response, at least in part, to receipt of one or more commands 105, NW I/O device 108 may directly write (e.g., in accordance with an RDMA (e.g., iWARP, IB, RoCE) protocol and/or in a manner that by-passes and/or is independent of OSE 32), in the manner commanded by one or more commands 105, one or more queue elements 116 to one or more submission queues 114. Thus, in effect, by issuing one or more commands 105 to NW I/O device 108, NW I/O device 106 may write one or more queue elements 116 to one or more submission queues 114 and one or more buffers 130A, respectively.

In this example, one or more commands 105 also may comprise and/or specify one or more values 201 and one or more of the indicators 181 that may indicate one or more locations of one or more doorbells 170 to which one or more values 201 are to be written. In response, at least in part, to these one or more values 201 and these one or more of the indicators 181 in one or more commands 105, NW I/O device 108 may directly write (e.g., in accordance with an RDMA (e.g., iWARP, IB, RoCE) protocol and/or in a manner that by-passes and/or is independent of OSE 32), in the manner commanded by one or more commands 105, one or more values 201 in doorbell 170. The writing of one or more values 201 in doorbell 170 may ring doorbell 170. Thus, in effect, by issuing one or more commands 105 to NW I/O device 108, NW I/O device 106 may ring doorbell 170.

In response, at least in part, to the ringing of doorbell 170, NVMe controller 112 may return to a fully operational state (e.g., if NVMe controller 112 had previously entered a reduced power state relative to this fully operational state), and may receive the one or more queue elements 116 that were written into one or more submission queues 114 (e.g., via RDMA commands with S-Tags or via PCIe memory access commands). NVMe controller 112 then may execute, at least in part, the one or more commands that are specified and/or embodied by one or more queue elements 116. This may result in NVMe controller 112 performing, at least in part, the one or more operations (e.g., one or more reads of storage 150 and/or mass storage 156 to obtain data 199) involving storage 150 and/or mass storage 156 and storing data 199 in one or more buffers (e.g., one or more buffers 130A).

After completion, at least in part, of these one or more operations involving storage 150 and/or mass storage 156, NVMe controller 112 may communicate to NW I/O device 108 that the one or more operations were completed. Also after completion, at least in part, of these one or more operations involving storage 150 and/or mass storage 156, NVMe controller 112 also may write, at least in part, one or more values to one or more doorbells 192 associated with NW I/O device 108. This may ring one or more doorbells 192. In response, at least in part, to the ringing of one or more doorbells 192, NW I/O device 108 may write one or more completion queue elements 190 to one or more completion queues 120 to facilitate the transfer of data 199 (e.g., via on or more RDMA write operations with NW I/O device 106) to one or more buffers 13 in client 10 (e.g., via one or more responses 197).

According to some examples, command interface 110 may be asynchronous in that, for example, completion queue elements may not be stored in an order in one or more completion queues 120 that corresponds to (1) the order in which command queue elements are stored in the one or more submission queues 114, (2) the order in which such command queue elements are forwarded for execution and/or completion by the NVMe controller 112, and/or (3) the order in which completion queue elements 190 are stored in one or more completion queues 120 and/or provided to NW I/O device 106 and/or client 10. In operation, NW I/O device 106 and/or client 10 may appropriately reorder, in the case of write commands issued from the client 10 and/or NW I/O device 106, corresponding completion queue elements 190 received from NW I/O device 108. However, in the case of read commands, in this embodiment, in order to permit respective data read from storage 150 and/or mass storage 156 to be appropriately associated with corresponding completion queue elements 190 for transmission to client 10 and/or NW I/O device 106, each completion queue element (e.g., completion queue element 190) resulting from completion indications placed in completion queues 120 by NW I/O device 108 may include the elements illustrated in FIG. 2.

Figure 2:
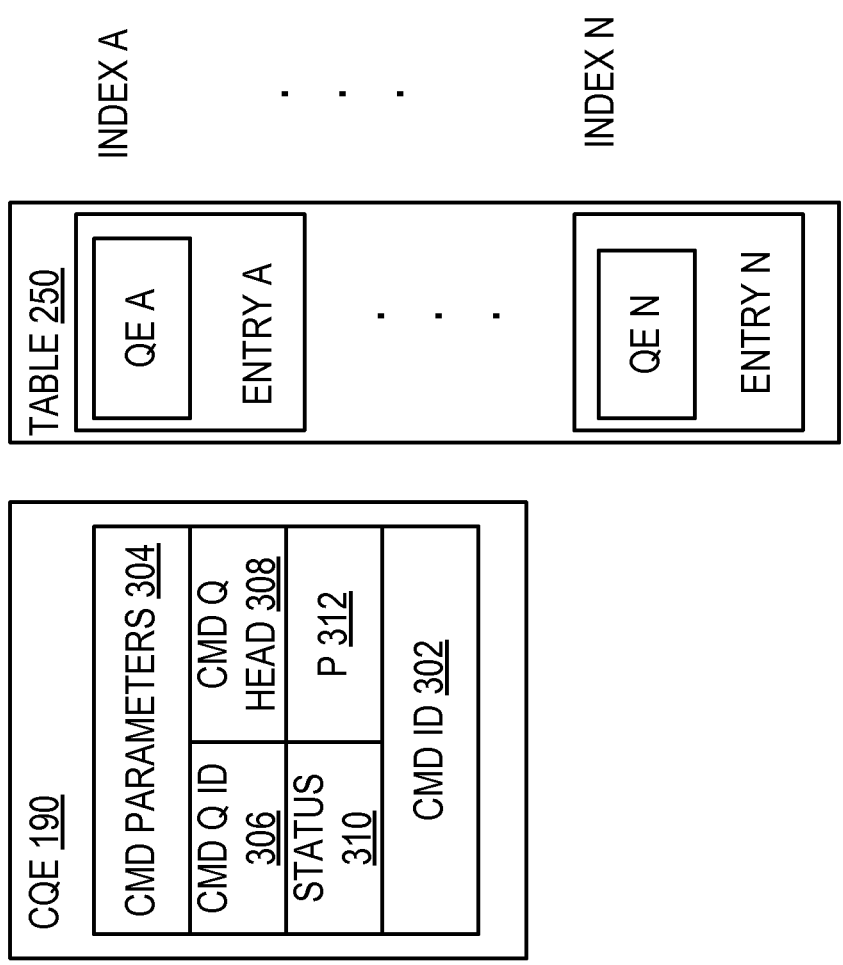
FIG. 2 illustrates an example completion queue element.

As shown in FIG. 2, completion queue element (e.g., completion queue element 190) may include one or more command parameters 304, one or more command queue identifiers 306, one or more command queue head position indicators 308, status information 310, one or more queue phase bit (P) 312, and/or one or more command identifiers 302. One or more command parameters 304 may be and/or indicate one or more command specific parameters of the one or more queue elements 116 and/or commands 105 that may correspond to and/or be associated with the one or more completion queue elements 190. One or more command queue identifiers 306 may indicate and/or specify the one or more submission queues 114 to which the one or more queue elements 116 were written. One or more command queue head position indicators 308 may indicate the current position (e.g., in the one or more submission queues 114 identified by one or more command queue identifiers 306) at which the one or more queue elements 116 may be located. Status information 310 may indicate whether the one or more commands 105 and/or one or more queue elements 116 were successfully performed by the NVMe controller 112. One or more phase bits 312 may indicate whether the one or more completion queue elements 190 constitute the most recently added valid entry (e.g., to service) in one or more completion queues 120. One or more command identifiers 302 may indicate, at least in part, and/or be identical to one or more corresponding command identifiers in the corresponding one or more queue elements 116. Command identifiers 302 may permit one or more completion queue elements 190 to be correctly associated with one or more corresponding queue elements 116 and/or with the respective data 199 read from the storage 150 and/or mass storage 156 as a result of the execution of these one or more corresponding queue elements 116.

In some examples, one or more command identifiers 302 may be selected so as not to collide with and/or be identical to any other command identifiers that may be currently used by any completion queue elements that have not yet been provided to client 10 and/or NW I/O device 106 by NW I/O device 108. The command identifiers that may be used in system 100 may be pre-calculated and/or pre-generated, and may be used as respective indices INDEX A . . . INDEX N for respective entries ENTRY A . . . ENTRY N in a table 250 that may be stored, at least in part, in memory 21. Each of the entries ENTRY A . . . ENTRY N in the table 250 may store one or more respective pre-calculated and/or pre-generated command queue elements QE A . . . QE N that may be associated with NW I/O device 108. Each respective element QE A . . . QE N may be associated with one or more respective buffers in one or more buffers 130A . . . 130N. Each of the buffers in one or more buffers 130A . . . 130N into which NVMe controller 112 may store data read from storage 150 and/or mass storage 156 also may be associated with one or more respective submission identifiers used in system 100 and/or respective entries ENTRY A . . . ENTRY N.

The command queue elements QE A . . . QE N may be stored and/or maintained in table 250 by client 10 and/or one or more agents 194. If one or more buffers 130A . . . 130N are statically allocated, table 250 may be static, and may correspond in terms of, for example, allocation characteristics to one or more buffers 13 that may be allocated in the client 10.

By way of example, after NVMe controller 112 reads data 199 from storage 150 and/or mass storage 156, NVMe controller 112 may store the data 199 in one or more buffers (e.g., one or more buffers 130A) that may be associated with one or more command identifiers 302, and may send an indication to NW I/O device 108 that an access command has been completed, e.g., ringing one or more doorbells 192.

In response, at least in part, to NVMe controller 112 ringing one or more doorbells 192, NW I/O device 108 may determine, based at least in part upon one or more queue phase bits 312, the one or more most recently added valid completion queue in one or more completion queues 120. NW I/O device 108 may use the one or more command identifiers 302 in one or more completion queue elements 190 to index into table 250 to locate the one or more entries (e.g., one or more entries ENTRY A) and one or more command queue elements (e.g., one or more queue elements QE A) in table 250 that may be associated with and/or identified, at least in part, by one or more command identifiers 302. NW I/O device 108 may execute, at least in part, one or more commands that may be associated with and/or embodied by these one or more command queue elements QE A. This may result, at least in part, in NW I/O 108 reading one or more buffers 130A to obtain data 199, and transmitting data 199 and one or more completion queue elements 190 to NW I/O device 106 and/or client 10 (e.g., via one or more responses 197). As a result, data 199 and/or one or more completion queue elements 190 may be copied into one or more client buffers 13.

Alternatively, in some examples, NW I/O device 108 may comprise, at least in part, a state machine (not shown). This state machine may be independent and/or separate from, at least in part, of one or more submission queues 114 that may be associated with and/or utilized by NW I/O device 108. This state machine may locate one or more command queue elements QE A in table 250 based at least in part upon one or more command identifiers 302, and may copy the one or more queue elements QE A into one or more corresponding submission queue elements 196A in one or more submission queues 126. The state machine then may signal NW I/O device 108 to access and execute, at least in part, one or more submission queue elements 196A in one or more submission queues 126.

Additionally or alternatively, without departing from these examples, NW I/O device 108 and/or NVMe controller 112 may be comprised, at least in part, in the not shown chipset, or in a not shown circuit board or device. Also additionally or alternatively, without departing from this embodiment, storage 150 and/or mass storage 156 may be comprised, at least in part, internally in server 20 or be external to server 20.

Further although the foregoing description has been made with reference to NW I/O device 108 being an RNIC, and NVMe controller 112 being an NVMe compliant storage controller, the principles of this embodiment may be applied to circumstances in which protocols other than and/or in addition to RDMA or NVMe may be employed, and/or in which NVMe controller 112 may be involved in executing and/or facilitating operations that do not involve storage 150 (e.g., other and/or additional input/output and/or communication-related operations). Accordingly, without departing from the above mentioned examples, NW I/O device 108 may utilize, and/or communications between client 10 and server 20 may employ, protocols other than and/or in addition to RDMA. Also, without departing from this embodiment, NW I/O device 108 or NVMe controller 112 may be involved in executing and/or may facilitate execution of such other and/or additional operations that may employ protocols other than PCIe or NVMe protocols. In these additional and/or alternative arrangements, hardware and/or firmware circuitry (not shown) may be comprised in circuitry 118 that may permit, at least in part, writing to doorbells 170 and/or 192 via, e.g., one or more interrupt mechanisms (e.g., one or more message signaled interrupts (MSI/MSI-X) and/or other mechanisms). This embodiment should be viewed broadly as covering all such modifications, variations, and alternatives.

Thus, in some examples, circuitry may be arranged, at least in part, to enable a first NW I/O device in a client to access, via a second NW I/O device in a server that is remote from the client and in a manner that is independent of an operating system environment in the server, at least one command interface of another (e.g., storage, and/or another/additional type of) controller of the server. The NW I/O device in the client and the NW I/O device in the server may be or comprise respective remote direct memory access-enabled network interface controllers (e.g., controllers capable, at least in part, of utilizing and/or communicating via RDMA). The command interface may include at least one (e.g., storage, and/or other/additional type of) controller command queue. Such accessing may include writing at least one queue element to the at least one submission queue to command the another controller to perform at least one operation (e.g., involving storage, and/or involving one or more other and/or additional types of operations, such as, other and/or additional input/output operations) associated with the another controller (e.g., an NVMe controller). The other controller may perform the at least one operation in response, at least in part, to the at least one queue element. Many alternatives, variations, and modifications are possible.

Thus, in some examples, the one or more command interfaces 110 of NVMe controller 112 in server 20 may be directly accessed by the client's NW I/O device 106 via one or more RDMA transactions, in a manner that by-passes, is independent of, and/or does not involve the server's OSE 32 and/or HP/CPU 12. Advantageously, this may permit storage commands, data, and completion messages to be communicated between the client and server much more quickly and efficiently, and with reduced latency. Furthermore, in this embodiment, interactions between NW I/O device 108 and NVMe controller 112 may be carried out entirely or almost entirely by hardware (e.g., utilizing peer-to-peer memory and doorbell writes), and also in a manner that by-passes, is independent of, and/or does not involve the server's OSE 32 and/or HP/CPU 12. Advantageously, this may permit such interactions to be carried out much more quickly and efficiently, and with reduce latency. Additionally, the above features of this embodiment may reduce the server's power consumption, heat dissipation, and the amount of bandwidth consumed by the OSE 32 and HP/CPU 12.

Many other modifications are possible. For example, as stated previously, in this embodiment, client 10 may comprise a plurality of clients. If RDMA is employed for communications between server 20 and the clients 10, in this embodiment, advantageously, the clients 10 may dynamically share buffers 130A . . . 130N, as a common pool of buffers, between or among the client 10 in carrying out their communications with server 20, NW I/O device 108, and/or NVMe controller 112. In order to permit such buffer sharing, NW I/O device 108 may be capable of manipulating, adjusting, and/or modifying, at least in part, buffer-specifying information that may be indicated, at least in part, in commands 105 provided to the server 20 by the clients 10 in order to allow the buffers 130A . . . 130N and/or other server resources to be shared among the clients 10 without resulting in, for example, contention-related issues.

For example, the one or more indicators 181 and/or S-Tags or T-Tags indicated by the one or more indicators 181 may include respective information that NW I/O device 108 may associate with one or more buffers and/or buffer pools in the buffers 130A . . . 130N, instead of and/or in addition to one or more memory region handles. In this arrangement, the clients 10 may perform RDMA read operations utilizing such indicators 181 and NW I/O device 108 may perform write operations to the one or more buffers and/or buffer pools indicated by the respective information and/or indicators 181. In carrying out its operations, NW I/O device 108 may appropriately adjust the actual commands and/or command queue elements provided to NVMe controller 112 in order to result in the correct buffers, etc. being written to by NVMe controller 112 when NVMe controller 112 carries out such commands and/or command queue elements.

Alternatively or additionally, without departing from the above examples, NW I/O device 108 may include and/or be associated with a shared receive queue (not shown) to receive, for example, commands 105 from multiple clients 10. NW I/O device 108 may be capable of substituting, at least in part, one or more appropriate server buffer addresses, values, and/or other information into one or more portions (e.g., queue elements 116, values 201, indicators 181, and/or other information) of the received commands 105 to permit sharing of the structures in the one or more command interfaces 110 between or among multiple clients 10, without resulting in contention or other degradation in performance. In this arrangement, the clients may not be provided and/or utilize one or more S-Tags to the storage controller's command queue and/or doorbell, and writing to these structures may be performed by the server's NW I/O device 108. Advantageously, this may permit multiple clients 10 that may be associated with and/or utilize the shared receive queue to utilize and/or share, at least in part, the same storage controller command queue, doorbell, and/or other structures.

For example, in the case of a write operation, one or more indicators 181, one or more values 201, and/or other information in one or more commands 105 may indicate, at least in part, one or more storage controller S-Tags or T-Tags for the write operation (and related information), and/or one or more RDMA S-Tags or T-Tags to one or more buffers to which one or more completion queue elements may be written. Based at least in part upon the one or more received commands 105 and/or other information stored in NW I/O device 108, NW I/O device 108 may select one or more buffers in buffers 130A . . . 130N and one or more locations in the submission queue 114 to which to post the data 199 to be written and one or more corresponding command queue elements to be forwarded to NVMe controller 112. NW I/O device 108 may post the data 199 and the one or more corresponding command queue elements in accordance with such selections, and thereafter, may ring doorbell 170. As posted by NW I/O device 108, the one or more command queue elements may indicate the one or more storage controller S-Tags or T-Tags supplied in the one or more commands 105, command identifier 302, security context information (e.g., to permit validation of the one or more storage controller S-Tags or T-Tags), and/or one or more S-Tags/T-Tags to the one or more buffers to which data 199 has been posted. After NVMe controller 112 has completed, at least in part, the requested one or more write operations and has sent indications of the completions, NVMe controller 112 may ring doorbell 192. Based at least in part upon information in table 250, NW I/O device 108 may generate and forward to the one or more clients that provided the received command 105 one or more appropriate responses 197 by forwarding completion indications to via NW I/O device 108.

In the case of a read operation, generally analogous information may be provided in command 105 and generally analogous operations may be performed by NW I/O device 108 and/or NVMe controller 112. However, in the case of a read operation, the data 199 read by NVMe controller 112 may be stored by NVMe controller 112 to one or more of the buffers 130A . . . 130N specified by the NW I/O device 108, and may be read by the NW I/O device 108, instead of vice versa (e.g., as may be the case in a write operation). NW I/O device 108 may transmit the read data 199 to the one or more clients that provided the received command 105 in one or more responses 197. In the foregoing arrangement, command 105 may be similar or identical to a command that may be utilized by a client to access storage local to the client, at least from the vantage point of one or more client-executed applications initiating such access. Advantageously, this may permit remote operations and/or RDMA transactions of the types previously described to be substantially transparent to these one or more client-executed applications.

Thus, in some examples, advantageously, it may be possible for multiple clients to share the storage controller's command queue, doorbells, and/or the server's buffers, and/or to write to these structures (via the server's NW I/O device) using an RDMA protocol, without suffering from resource contention issues (and/or other disadvantages) that might otherwise occur. The server's NW I/O device may be capable of modifying, at least in part, information associated with and/or comprised in the clients' commands 105 to facilitate such sharing and/or sharing of RDMA S-Tag/T-Tag information between or among the clients. Advantageously, this may permit RDMA protocol to be employed for command communication and/or completion information between the server and multiple clients, with improved scalability, while reducing the memory consumption to implement such features, and without degradation in communication line rate.

Figure 3:
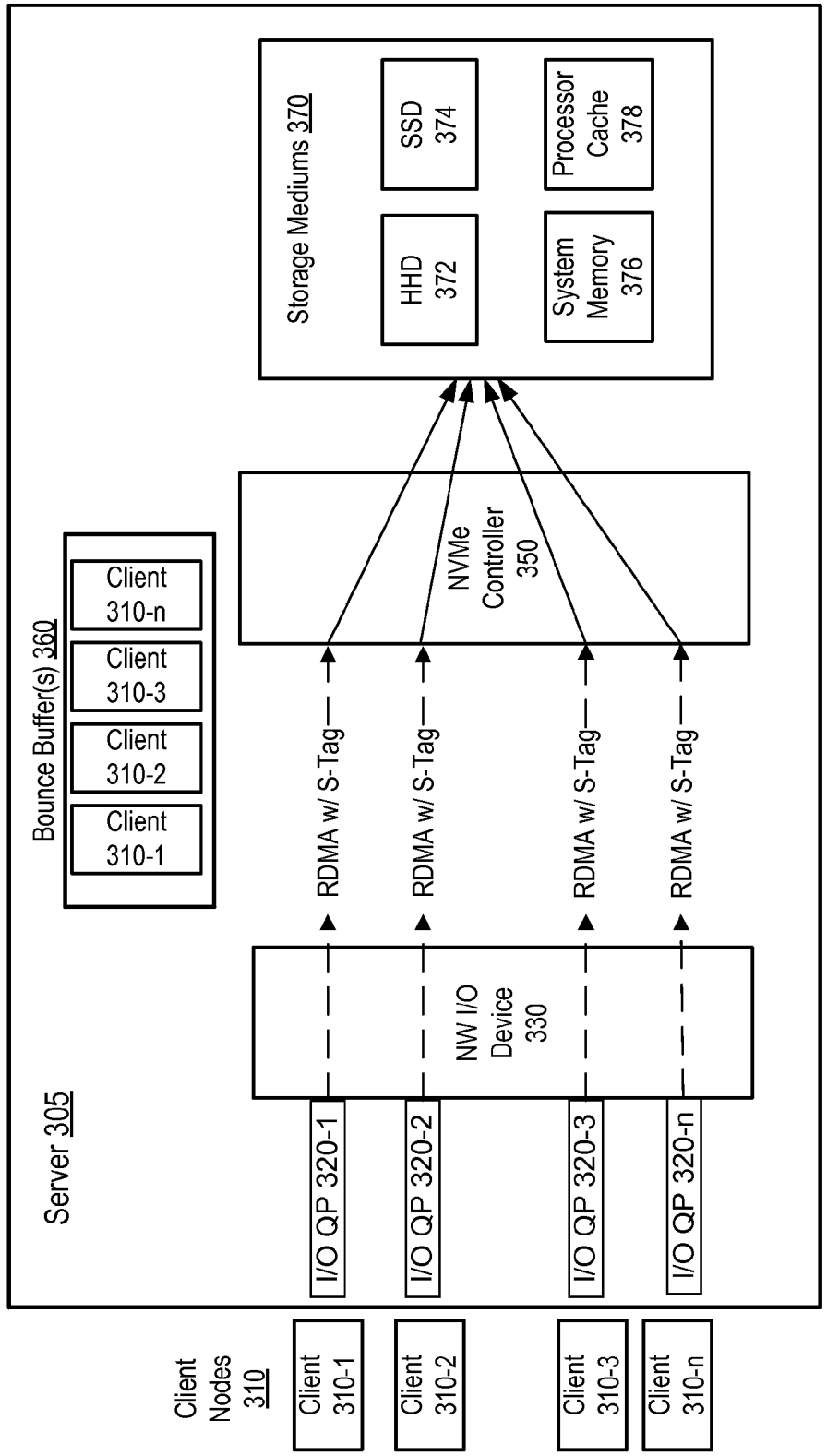
FIG. 3 illustrates a second example system.

FIG. 3 illustrates a second example system. As shown in FIG. 3, the second example includes a system 300. According to some examples, system 300 may include multiple client nodes 310-1 to 310-n (where "n" represents any positive integer greater than 3) and a server 305. For these examples, a NW I/O device 330, an NVMe controller 350, bounce buffer(s) 360 or storage mediums 370 may be located maintained at or coupled with server 305. Also, as shown in FIG. 3, storage mediums 370 may include, but are not limited to, various types of storage mediums to include a hard disk drive (HHD) 372, a solid state drive (SSD) 374, a system memory 376 or a processor cache 378.

In some examples, logic and/or features executed by circuitry for either network I/O device 330 and/or server 305 may allocate resources to clients 310-1 to 310-n to facilitate remote access to storage mediums 370 controlled by or accessible through NVMe controller 350. For these examples, separate I/O queue pairs (QPs) 320-1 to 320-n may be allocated or assigned to clients 310-1 to 310-n, respectively. Also, at least portions of bounce buffer(s) 360 may be allocated or assigned to clients 310-1 to 310-n. According to some examples, I/O QPs 320-1 to 320-n and/or bounce buffer(s) 360 may be part of system memory resident at server 305 that may be separately managed or part of separate system memory included in system memory 376. Alternatively, I/O QPs 320-1 to 320-n may be maintained at or with NW I/O device 330.

According to some examples, I/O QPs 320-1 to 320-n may separately include both command submission queues and command completion queues utilized by logic and/or features at NW I/O device 330 to exchange information with clients 310-1 to 310-n regarding commands to access the storage controlled by NVMe controller 350.

In some examples, as described more below, logic and/or features executed by circuitry at NW I/O device 330 may receive an RDMA command from a client such as client 310-1 that includes an S-Tag. As described more below, the S-Tag may have been pre-assigned to client 310-1 by server 305 software (not shown) and may indicate an amount or portion of storage capacity for storage mediums 370 that was allocated to client 310-1. For these examples, the RDMA command may to be access a storage medium from among the plurality of storage mediums included in storage mediums 370 and controlled and/or accessible through NVMe controller 350. The logic and/or features at NW I/O device 330 may forward the RDMA command with the S-Tag to NVMe controller 350. Also as described more below, NVMe controller 350 may provide access to client 310-1 of a storage medium from among storage mediums 370 based on an association scheme that associates the S-Tag included in the RDMA command to the storage medium.

According to some examples, since networking ordering semantics may be different from storage operation ordering semantics, NVMe controller 350 may be restricted from reordering operations associated with RDMA commands received with allocated S-Tags. Alternatively, clients sending RDMA commands with the allocated S-Tags may be required to supply ordering information with the RDMA commands. Also, the clients may track completions to know what was completed to verify that work submitted was properly performed.

In some examples, the storage mediums included in storage mediums 370 may operate in compliance with the PCIe and/or NVMe Specifications. Also HHD 372 may include various types of hard disk drives and SSD 374 may include various types of non-volatile memory to included, but not limited to, 3-dimensional cross-point memory, flash memory, ferroelectric memory, SONOS memory, polymer memory, nanowire, FeTRAM, FeRAM, nanowire or EEPROM.

In some examples, system memory 376 may include a volatile memory device such as a dynamic random access (DRAM) device or a static random access (SRAM) device. System memory 376 may also include a non-volatile memory device made up of the same types of non-volatile memory mentioned above for SSD 374. According to some examples, system memory 376 including both a volatile memory device and a non-volatile memory device may occur in a two level memory (2LM) system.

According to some examples, processor cache 378 may include cache memory for a host processor (not shown) for server 305. For these examples, the host processor may have some available storage capacity that could at least temporarily be used for storage operations.

FIG. 4 illustrates an example allocation table 400. In some examples, as shown in FIG. 4, clients 310-1 to 310-n may each be allocated one or more S-Tags as depicted in allocation table 400. For these examples, a given S-Tag may be further assigned to a portion of a storage medium capacity by assigning a logical block address (LBA) to the given S-Tag (e.g., storage items to include one or more of a file, filesystem or blocks). For example, client 310-1 has been allocated S-Tags 410-1 to 410-n that were assigned to LBAs 405-1 to 405-n, respectively. Software at server 305 may separately forward information (e.g., through NW I/O device 330) to clients 310-1 to 310-n to indicate which S-Tags and their corresponding portions of storage medium 370's capacity have been allocated.

According to some examples, the assigned storage medium capacity may be derived from a total available storage capacity for storage mediums 370. Rather than assigning S-Tags to a given physical or logic address associated with a single storage medium, S-Tags may be assigned to a storage capacity for a plurality of storage mediums by software at server 305. S-Tags may be assigned to the storage capacity to allow logic and/or features at NW I/O device 330 and/or NVMe controller 350 to provide access to a given storage medium based on a recognition that a given S-Tag provides access to a given storage capacity and also based on an association scheme. In some examples, the association scheme may be used by the logic and/or features to associate a given S-Tag included in an RDMA command received from a client to the given storage medium, or assign a given S-Tag for a given storage item.

In some examples, the association scheme may associate S-Tags to storage mediums from among storage mediums based on one more policies that enable efficient use of storage resources maintained at server 305 at run time rather than only during the time that S-Tags are initially allocated to clients. As described more below, these policies may include, but are not limited to, a usage pattern for client accesses, quality of service requirements, a load balancing scheme between the plurality of storage mediums or a wear leveling between at least some of the plurality of storage mediums.

FIG. 5 illustrates an example association scheme 500. In some examples, as shown in FIG. 5, association scheme 500 may include four policies, although this disclosure is not limited to the four policies, any number of policies may be part of an association scheme to associate one or more S-Tags with a given storage medium. For these examples, the four polices included in association scheme 500 may be usage pattern, quality of service, load balancing and wear leveling.

In some examples, as shown in FIG. 5, association scheme 500 shows a metric of frequency of access for the usage pattern policy. For these examples, logic and/or features at NW I/O device 330 or NVMe controller 350 may associate an S-Tag received with an RDMA command to access a storage medium based on a frequency of RDMA commands received for the S-Tag. For example, a high frequency (e.g., every few seconds or less) may require types of memory having relatively short response times or latencies. Therefore, high frequency access may be associated with system memory 376 or cache memory 378. Medium frequency access (e.g., every 10 seconds or every minute) may need types of memory that may have somewhat short response times. For medium frequency access, SSD memory 374 may be associated with S-Tags meeting this metric. Low frequency (e.g., more than every minute) may have longer response times and HDD memory 372 may be associated with S-Tags meeting this metric.

According to some examples, association scheme 500 shows a metric of transaction latency for completion of commands received for the quality of service (QOS) policy. For these examples, logic and/or features at NW I/O device 330 or NVMe controller 350 may associate an S-Tag received with an RDMA command to a storage medium based on transaction latency requirements for the QOS policy requiring low, medium or high transaction latencies. Low (e.g., a few microseconds) would cause S-Tags to be associated with system memory 376 or processor cache 378. Medium (e.g., less than a second) would cause S-Tags to be associated with SSD 374. Low (e.g., more than a second) would cause S-Tags to be associated with HDD 372.

In some examples, association scheme 500 shows a metric of storage medium in use for the load balancing policy. For these examples, logic and/or features at NW I/O device 330 or NVMe controller 350 may associate an S-Tag received with an RDMA command dependent on balancing out the number of S-Tags currently associated with storage mediums (e.g., being used to completed RDMA commands). Also, more S-Tags may be associated with storage mediums having higher storage capacities (e.g., HHD372) provided other policies (if being implemented) are met.

According to some examples, association scheme 500 shows a metric of number of accesses for the wear leveling policy. For these examples, logic and/or features at NW I/O device 330 or NVMe 350 may associate an S-Tag received with an RDMA command based on whether a number of accesses to a given non-volatile memory exceeds a threshold. This metric may apply to non-volatile memories possibly included in SSD 374 or system memory 376. According to some examples, if the threshold is exceeded for the given non-volatile memory, the wear leveling policy may lead to an elimination or reduction in the association of S-Tags to the storage medium that has the given non-volatile memory.

Figure 6:
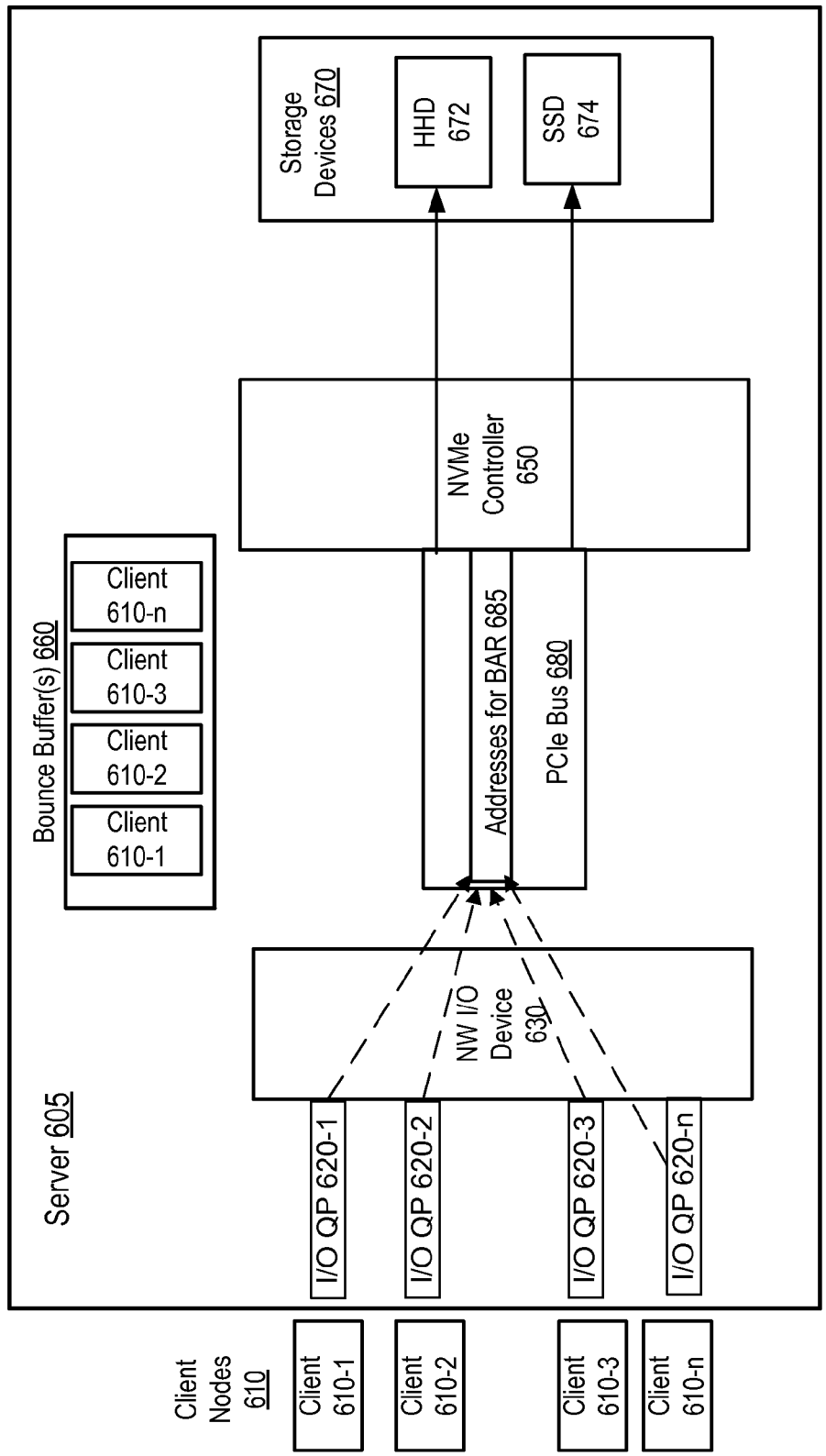
FIG. 6 illustrates a third example system.

FIG. 6 illustrates a third example system. As shown in FIG. 6, the third example system includes a system 600. According to some examples, system 600 may include multiple client nodes 610-1 to 610-n, a server 605 and a NW I/O device 630, an NVMe controller 650 or bounce buffer(s) 660 maintained at server 605. System 600 also includes a PCIe bus 680 coupled between NW I/O device 630 and NVMe controller 650. As described more below, a memory mapping of storage devices 670 to addresses for base address register (BAR) 685 accessible via PCIe bus 680 may be generated by logic and/or features of NVMe controller 650 to facilitate remote access by clients 610-1 to 610-n to storage devices 670 via use of PCIe memory access commands. As shown in FIG. 6, storage devices 670 may include HHD 672 (e.g., including hard disk drives) and SSD 674 (e.g., including solid state drives).

In some examples, logic and/or features executed by circuitry for either network I/O device 630 and/or server 605 may allocate resources to clients 610-1 to 610-n to facilitate remote access to storage devices 670 controlled by NVMe controller 650. For these examples, separate I/O queue pairs (QPs) 620-1 to 620-n may be allocated or assigned to clients 610-1 to 610-n, respectively. Also, at least portions of bounce buffer(s) 660 may be allocated or assigned to clients 610-1 to 610-n. According to some examples, I/O QPs 620-1 to 620-n and/or bounce buffer(s) 660 may be part of system memory resident at server 605. Alternatively, I/O QPs 620-1 to 620-n may be maintained at or with NW I/O device 630.

According to some examples, I/O QPs 620-1 to 620-n may separately include both command submission queues and command completion queues utilized by logic and/or features at NW I/O device 630 to exchange information with clients 610-1 to 610-n regarding PCIe memory access commands to access storage devices 670 controlled by NVMe controller 650.

In some examples, logic and/or features at NVMe controller 650 may be capable of generating a memory mapping of storage devices 670 to addresses for BAR 685 accessible via PCIe bus 680. The logic and/or features at NVMe controller 650 may also be capable of forwarding information associated with the memory mapping to clients 610-1 to 610-n via NW I/O device 630. Responsive to receiving this information a client such as client 610-1 may use the information to send a PCIe memory access command via NW I/O device 630 for client 610-1 to have storage access to the one or more storage devices included in storage devices 670. The logic and/or features at NVMe controller 650 may receive the PCIe memory access command via PCIe bus 680 and may then translate the PCIe memory access command. For these examples, the received PCIe memory access command may be translated based on the memory mapping in order provide the client storage access to the one or more storage devices.

Although not shown in FIG. 6, in some examples, a PCIe bridge or non-transparent bridge might be placed between NW I/O controller 330 and NVMe controller 350 to aggregate several NVMe controllers. For these examples, a single, large memory mapping of storage devices controlled by these NVMe controllers to addresses for a BAR accessible via the PCIe bridge or non-transparent bridge may then be generated and used to translate PCIe memory access commands.

FIG. 7 illustrates an example base address register (BAR) mapping table 700. In some examples, logic and/or features at NVMe controller 650 may be capable of creating BAR mapping table 700 to generate a memory mapping of one or more storage devices to addresses for a BAR accessible via PCIe bus. For example, addresses for a BAR may include LBAs 675-1 to 675-4 that may map to LBAs 672-1 to 672-n, respectively of HDD 672. Also, addresses for a BAR may include LBAs 675-5 to 675-8 that may map to LBAs 674-1 to 674-n, respectively of SSD 674.

According to some examples, the logic and/or features at NVMe controller 650 may then forward at least some information for the memory mapping to individual clients 610-1 to 610-n. For example, what information is forwarded may depend on a resource allocation scheme that may limit the number of memory mapped storage addresses a given client may access using a PCIe memory access command. A PCIe memory access command may map to one or more NVMe storage commands and cause NVMe controller 650 to carry out or complete one or more storage commands that may include, but are not limited to, a flush command, a write command, a read command, a write uncorrectable command or a compare command. Also, according to some examples, to provide clients 610-1 to 610-n storage access to storage devices 670, these clients may access a storage item to include, but not limited to, a directory, a file or a block of storage. For these examples, NVMe controller 650 may complete the storage command for the storage item (e.g., write or read a directory to or from SSD 674).

Figure 8:
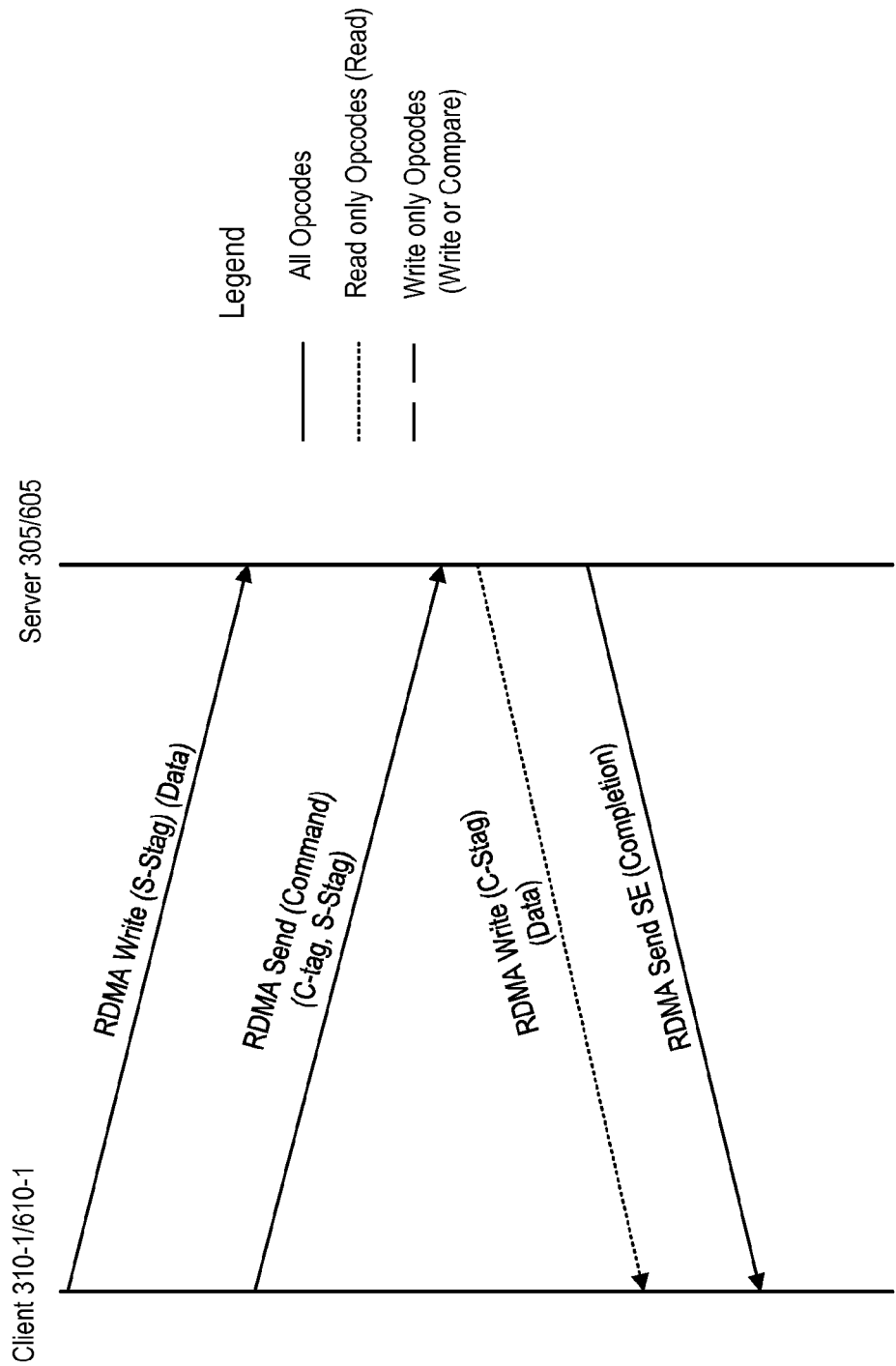
FIG. 8 illustrates an example communication flow.

FIG. 8 illustrates an example communication flow 800. In some examples, as shown in FIG. 8, communication flow 800 depicts example communications between client 310-1/610-1 and server 305/605. For these examples, the communications may be compatible with an RDMA (e.g., iWARP, IB, RoCE) protocol.

In some examples, starting from the top of FIG. 8, the first line "RDMA write (S-Stag)(Data)" may be an RDMA Write message carrying transaction data. The second line "RDMA Send (Command) (C-tag, S-Stag)" may be an RDMA Send message from client 310-1/610-1 that may include the command for access to the storage controlled by NVMe controller 350/650. The third line "RDMA Write (C-Stag) (Data)" may be an RDMA write message to carry data from a read of the storage and targeting a buffer (e.g., identified by C-Stag) maintained at client 310-1/610-1 that was originally indicated in a read request command. The last line "RDMA Send SE (Completion)" may be an RDMA Send message indicating that a solicited event (SE) such as a read command was completed by NVMe controller 350/650.

According to some examples, as shown in FIG. 8, solid lines may be related to all operation codes (Opcodes), dotted lines may be related to read only Opcodes and dashed lines may be related to write only Opcodes that may include write or compare commands.

Figure 9:
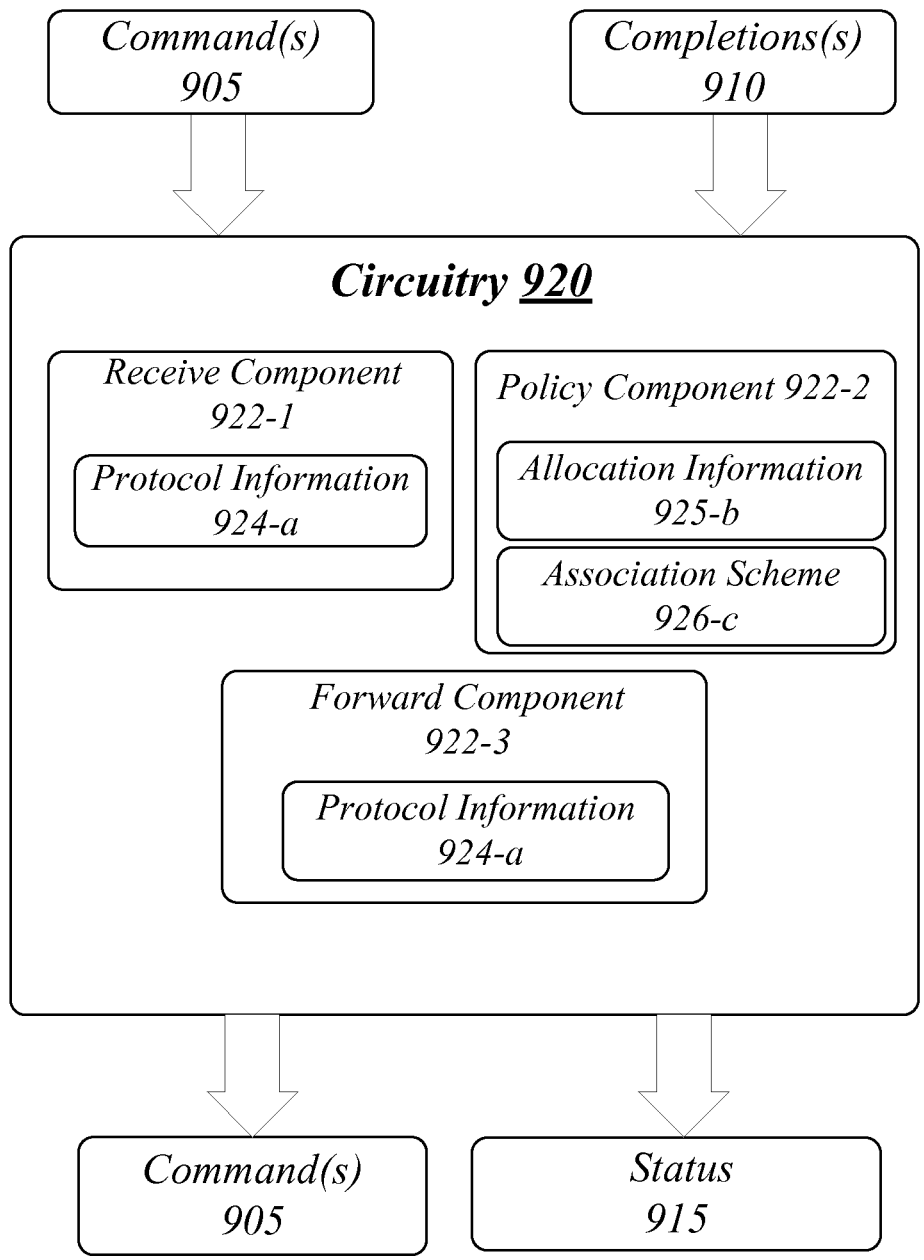
FIG. 9 illustrates an example block diagram for a first apparatus.

FIG. 9 illustrates an example block diagram of a first apparatus. As shown in FIG. 9, the first apparatus includes apparatus 900. Although apparatus 900 shown in FIG. 9 has a limited number of elements in a certain topology, it may be appreciated that the apparatus 900 may include more or less elements in alternate topologies as desired for a given implementation.

The apparatus 900 may be supported by circuitry 920 maintained at a network I/O device coupled to a server. Circuitry 920 may be arranged to execute one or more software or firmware implemented components 922-a. It is worthy to note that "a" and "b" and "c" and similar designators as used herein are intended to be variables representing any positive integer. Thus, for example, if an implementation sets a value for a=3, then a complete set of software or firmware for components 922-a may include components 922-1, 922-2 or 922-3. The examples presented are not limited in this context and the different variables used throughout may represent the same or different integer values.

According to some examples, circuitry 920 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 920 may also be an application specific integrated circuit (ASIC) and at least some components 922-a may be implemented as hardware elements of the ASIC.

According to some examples, apparatus 900 may include a receive component 922-1. Receive component 922-1 may be capable of receiving command(s) 905 via messages in an RDMA compliant (e.g., iWARP, IB, RoCE) protocol. Command(s) 905 may have been sent from remote clients to a server and may include pre-allocated S-Tags associated with allocated portions of storage capacity for a plurality of storage mediums. For these examples, the server may be coupled to a NW I/O device having an apparatus 900. Command(s) 905 may include RDMA commands to access a storage medium controlled by or accessible via an NVMe controller located at or with the server. Receive component 922-1 may be capable of at least temporarily storing protocol information 924-a (e.g., in a data structure such as a lookup table (LUT)) in order to interpret or decode at least portions of command(s) 905. Receive component 922-1 may also be capable of receiving completion(s) 910 that may include indications of completions of commands forwarded to the NW I/O device. Receive component 922-1 may also obtain NVMe protocol information from protocol information 924-a to interpret or decode received completion(s) 910.

In some examples, apparatus 900 may also include a policy component 922-2. Policy component 922-2 may be capable of associating one or more S-Tags included in command(s) 905 received by receive component 922-1 with a storage medium based on an association scheme. The association scheme may be obtained from or based on allocation information 925-b and association scheme 926-c. Allocation information 925-b or association scheme 926-c may be stored in a data structure such as a LUT. Allocation information 925-b may include information of allocations for S-Tags to clients. Association scheme 926-b may be based on association scheme 500 and may involve implementing policies for a usage pattern for one or more previous client accesses to the plurality of storage mediums, a QOS requirement associated with the client for access to the plurality of storage mediums, a load balancing scheme between the plurality of storage mediums or a wear leveling between at least some of the plurality of storage mediums.

In some examples, apparatus 900 may also include a forward component 922-3. Forward component 922-3 may be capable of forwarding command(s) to the NVMe controller maintained at the server for the NVMe controller to provide access to the storage medium based on the association scheme used by policy component 922-2 that associated the S-Tag included in the received RDMA to the storage medium. Forward component 922-3 may also be capable of forwarding status 915 to the client that originally sent command(s) 905. Status 915, for example, may indicate the status of command(s) 905 based on received completion(s) 910 sent by the NVMe controller following completion of command(s) 905. Forward component 922-3 may be capable of at least temporarily storing protocol information 924-a (e.g., in an LUT) in order to encode command(s) 905 in PCIe or NVMe compliant format to be sent to or towards the NVMe controller or to encode at least portions of status 915 in an RDMA compliant (e.g., iWARP, IB, RoCE) protocol to be sent to the client that originated command(s) 905.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 10 illustrates an example of a first logic flow. As shown in FIG. 10, the first logic flow includes logic flow 1000. Logic flow 1000 may be representative of some or all of the operations executed by one or more logic, features, or devices described herein, such as apparatus 900. More particularly, logic flow 1000 may be implemented by receive component 922-1, policy component 922-2 or forward component 922-3.

According to some examples, logic flow 1000 at block 1002 may receive an RDMA command including an S-Tag for a client remote to a server to access a storage medium from among a plurality of storage mediums coupled with the server to include a non-volatile memory storage medium and a volatile memory storage medium. For example, command(s) 905 including an S-Tag allocated to a portion of memory for the plurality of storage mediums may be received by receive component 922-1 included in an apparatus 900 for a NW I/O device coupled to the server.

In some examples, logic flow 1000 at block 1004 may forward the RDMA command to an NVMe controller maintained at the server for the NVMe controller to provide access to the storage medium based, at least in part, on an association scheme that associates the S-Tag included in the RDMA command to the storage medium. For example, policy component 922-2 may associate the S-Tag with the storage medium based on an allocation scheme similar to allocation scheme 500 and forward component 922-3 may forward the command(s) 905 along with the association information that associates the S-Tag with the storage medium.

According to some examples, logic flow 1000 at block 1006 may then receive a command completion message from the NVMe controller. Also at block 1006, logic flow 1000 may forward a status of completion of the RDMA command to the client based on the command completion message. For these examples, receive component 922-1 may receive completions(s) 910 and forward component 922-3 may send status 915 to the client that sent command(s) 905 based on information received with completion(s) 910.

Figure 11:
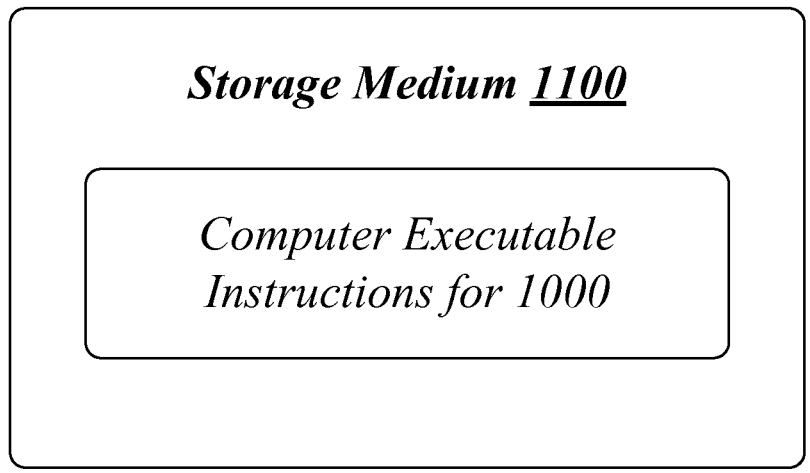
FIG. 11 illustrates an example of a first storage medium.

FIG. 11 illustrates an example of a first storage medium. As shown in FIG. 11, the first storage medium includes storage medium 1100. Storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
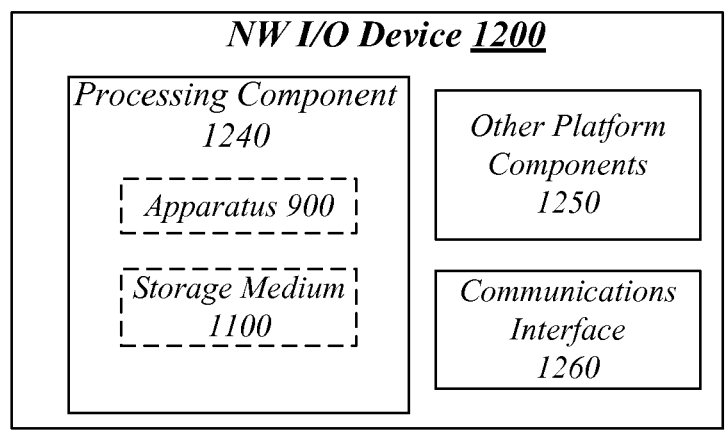
FIG. 12 illustrates an example network input/output device.

FIG. 12 illustrates an example NW I/O device 1200. In some examples, as shown in FIG. 12, NW I/O device 1200 may include a processing component 1240, other platform components 1250 or a communications interface 1260. According to some examples, NW I/O device 1200 may be implemented in a NW I/O device coupled to a server in a system or data center as mentioned above.

According to some examples, processing component 1240 may execute processing operations or logic for apparatus 900 and/or storage medium 1100. Processing component 1240 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1250 may include common computing elements, such as one or more processors, multi-core processors, co-processors, memory units, chipsets, controllers, peripherals, interfaces, oscillators, timing devices, and so forth. Examples of memory units may include without limitation various types of computer readable and machine readable storage media in the form of one or more higher speed memory units, such as ROM, RAM, DRAM, DDRAM, SDRAM, SRAM, PROM, EPROM, EEPROM, flash memory or any other type of storage media suitable for storing information.

In some examples, communications interface 1260 may include logic and/or features to support a communication interface. For these examples, communications interface 1260 may include one or more communication interfaces that operate according to various communication protocols or standards to communicate over direct or network communication links. Direct communications may occur via use of communication protocols or standards described in one or more industry standards (including progenies and variants) such as those associated with the PCIe specification, the NVMe specification, the RDMA Protocol specification, the IEEE 802-2-2008 specification, RFC 791 or RFC 793.

The components and features of NW I/O device 1200 may be implemented using any combination of discrete circuitry, application specific integrated circuits (ASICs), logic gates and/or single chip architectures. Further, the features of NW I/O device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary NW I/O device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 13:
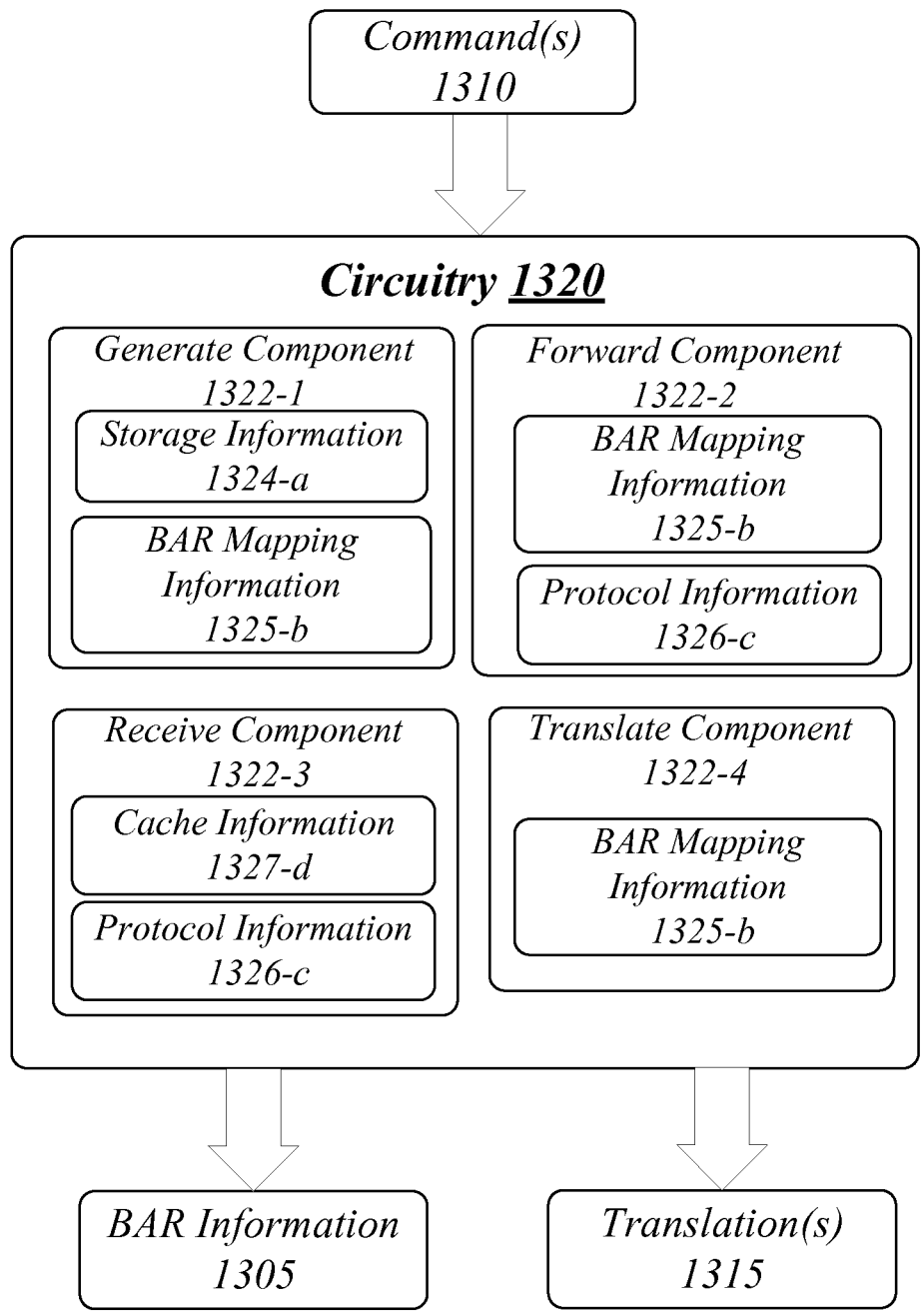
FIG. 13 illustrates an example block diagram for a second apparatus.

FIG. 13 illustrates an example block diagram of a second apparatus. As shown in FIG. 13, the second apparatus includes apparatus 1300. Although apparatus 1300 shown in FIG. 13 has a limited number of elements in a certain topology, it may be appreciated that the apparatus 1300 may include more or less elements in alternate topologies as desired for a given implementation.

The apparatus 1300 may be supported by circuitry 1320 maintained at an NVMe controller located at or with a server. Circuitry 1320 may be arranged to execute one or more software or firmware implemented components 1322-a. It is worthy to note that "a" and "b" and "c" and similar designators as used herein are intended to be variables representing any positive integer. Thus, for example, if an implementation sets a value for a=4, then a complete set of software or firmware for components 1322-a may include components 1322-1, 1322-2, 1322-3 or 1322-4. The examples presented are not limited in this context and the different variables used throughout may represent the same or different integer values.

According to some examples, circuitry 1320 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 1320 may also be an application specific integrated circuit (ASIC) and at least some components 1322-a may be implemented as hardware elements of the ASIC.

According to some examples, apparatus 1300 may include a generate component 1322-1. Generate component 1322-1 may be capable of generating a memory mapping of one or more storage devices to addresses for a BAR accessible via a PCIe bus between an NVMe controller including apparatus 1300 and a NW I/O device coupled to a server that maintains the NVMe controller. For these examples, generate component 1322-1 may be capable of at least temporarily storing storage information 1324-a (e.g., in a LUT) and using information such as LBAs for storage devices to generate the memory mapping. Generate component may also at least temporarily store the generated memory mapping in BAR mapping information 1325-b. BAR mapping information 1325-b may be maintained in a data structure such as LUT.

In some examples, apparatus 1300 may also include a forward component 1322-2. Forward component 1322-2 may be capable of forwarding information associated with the memory mapping to a client remote to the server via the NW I/O device. For these examples, forward component 1322-2 may access BAR mapping information 1325-b to forward BAR information 1305. Forward component 1322-2 may also use protocol information 1325-c to forward bar information 1305 to the client through the NW I/O device.

According to some examples, apparatus 1300 may include a receive component 1322-3. Receive component 1322-3 may be capable of receiving command(s) 1310 via PCIe memory access commands forwarded from the NW I/O device and originating from the client. The PCIe memory access commands may be for the client to have storage access to the one or more storage devices controlled by the NVMe controller. Receive component 1322-3 may be capable of at least temporarily storing protocol information 1324-c (e.g., in a data structure such as a lookup table (LUT)) in order to interpret or decode at least portions of command(s) 1310. Receive component 1322-3 may also use cache information 1327-d to potentially cache one or more command(s) 1310 in a cache maintained at the NVMe controller to enable apparatus 1300 to meet PCIe transaction latency requirements when faced with possible bursts of commands.

In some examples, apparatus 1300 may also include a translate component 1322-4. Translate component 1322-4 may be capable of translating received command(s) 1310 that include PCIe memory access commands. For these examples, translate component 1322-4 may use BAR mapping information 1325-b to perform the translation and provide the client storage access to the one or more storage devices using translation(s) 1315.

FIG. 14 illustrates an example of a second logic flow. As shown in FIG. 14, the second logic flow included logic flow 1400. Logic flow 1400 may be representative of some or all of the operations executed by one or more logic, features, or devices described herein, such as apparatus 1300. More particularly, logic flow 1400 may be implemented by generate component 1322-1, forward component 1322-2, receive component 1322-3 or translate component 1322-4.

According to some examples, logic flow 1400 at block 1402 may generate, at an NVMe controller maintained at a server, a memory mapping of one or more storage devices controlled by the NVMe controller to addresses for a BAR accessible via a PCIe bus between the NVMe controller and a NW I/O device coupled to the server. For these examples, generate component 1322-1 may generate the memory mapping and create a BAR mapping table similar to BAR mapping table 700.

In some examples, logic flow 1400 at block 1404 may forward information associated with the memory BAR to a client remote to the server via the NW I/O device. For example, forward component 1322-2 may forward BAR information 1305 to the client. BAR information 1305 may include the information similar to the information included in BAR mapping table 700.

According to some examples, logic flow 1400 at block 1406 may then receive a PCIe memory access command forwarded from the NW I/O device and originating from the client. Also, the PCIe memory access command is for the client to have storage access to the one or more storage devices. For example, receive component 1322-3 may receive command(s) 1310 that include the PCIe memory access command.

In some examples, logic flow 1400 at block 1408 may translate the PCIe memory access command based on the memory mapping to provide the client storage access to the one or more storage devices. For example, translate component 1322-4 may translate command(s) 1310 that include the PCIe memory access command that may result in translation(s) 1315 that result in the client obtaining storage access to the one or more storage devices controlled by the NVMe controller.

FIG. 15 illustrates an example of a second storage medium. As shown in FIG. 15, the second storage medium includes storage medium 1500. Storage medium 1500 may comprise an article of manufacture. In some examples, storage medium 1500 may include any non-transitory computer readable medium or machine readable medium, such as an optical, magnetic or semiconductor storage. Storage medium 1500 may store various types of computer executable instructions, such as instructions to implement logic flow 1400. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

FIG. 16 illustrates an example NVMe controller 1600. In some examples, as shown in FIG. 16, NVMe controller 1600 may include a processing component 1640, other platform components 1650 or a communications interface 1660. According to some examples, NVME controller 1600 may be implemented in a controller coupled to or maintained at a server in a system or data center as mentioned above.

According to some examples, processing component 1640 may execute processing operations or logic for apparatus 1300 and/or storage medium 1500. Processing component 1640 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1650 may include common computing elements, such as one or more processors, multi-core processors, co-processors, memory units, chipsets, controllers, peripherals, interfaces, oscillators, timing devices, and so forth. Examples of memory units may include without limitation various types of computer readable and machine readable storage media in the form of one or more higher speed memory units, such as ROM, RAM, DRAM, DDRAM, SDRAM, SRAM, PROM, EPROM, EEPROM, flash memory or any other type of storage media suitable for storing information.

In some examples, communications interface 1660 may include logic and/or features to support a communication interface. For these examples, communications interface 1660 may include one or more communication interfaces that operate according to various communication protocols or standards to communicate over communication links. Communications may occur via use of communication protocols or standards described in one or more industry standards (including progenies and variants) such as those associated with the PCIe specification or the NVMe specification.

The components and features of NVMe controller 1600 may be implemented using any combination of discrete circuitry, application specific integrated circuits (ASICs), logic gates and/or single chip architectures. Further, the features of NVMe controller 1600 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary NVMe controller 1600 shown in the block diagram of FIG. 16 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry for a network input/output device coupled to a server;
   a receive component for execution by the circuitry to receive a remote direct memory access (RDMA) command including a steering tag (S-Tag) from a client remote to the server, the RDMA command for the client to access a storage medium from among a plurality of storage mediums coupled with the server to include a non-volatile memory storage medium and a volatile memory storage medium, the plurality of storage mediums having a given storage capacity and software for the server to have allocated the S-Tag included in the received RDMA command to the client and to a first portion of the given storage capacity;
   a forward component for execution by the circuitry to forward the RDMA command to a Non-Volatile Memory Express (NVMe) controller maintained at the server for the NVMe controller to provide access to the storage medium based, at least in part, on an association scheme that associates the S-Tag included in the RDMA command to the storage medium; and
   a policy component for execution by the circuitry to associate the first portion of the given storage capacity with the storage medium based, at least in part, on the association scheme.

2. The apparatus of claim 1, the RDMA command received in a packet compatible with a RDMA protocol to include one of Internet Wide Area RDMA protocol (iWARP), Infinband or RDMA over Converged Ethernet (RoCE).

3. The apparatus of claim 1, the RDMA command to access the storage medium includes one of a flush command, a write command, a read command, a write uncorrectable command or a compare command.

4. The apparatus of claim 1, the plurality of storage mediums include at least one of a hard disk drive (HDD) or a solid state drive (SSD), the SSD having non-volatile memory comprising at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

5. The apparatus of claim 1, the plurality of storage mediums include system memory comprising at least one of a volatile memory device or a non-volatile memory device.

6. The apparatus of claim 1, the plurality of storage mediums include processor cache memory for one or more processors maintained at the server.

7. The apparatus of claim 1, the association scheme comprising associating of S-Tags to storage mediums based on one or more of a usage pattern for one or more previous client accesses to the plurality of storage mediums, a quality of service requirement associated with the client for access to the plurality of storage mediums, a load balancing scheme between the plurality of storage mediums, or a wear leveling between at least some of the plurality of storage mediums.

8. A method comprising:
   receiving, at a network input/output device for a server, a remote direct memory access (RDMA) command including a steering tag (S-Tag) from a client remote to the server, the RDMA command for the client to access a storage medium from among a plurality of storage mediums coupled with the server to include a non-volatile memory storage medium and a volatile memory storage medium, the plurality of storage mediums having a given storage capacity and software for the server to have allocated the S-Tag included in the received RDMA command to the client and to a first portion of the given storage capacity; and
   forwarding the RDMA command to a Non-Volatile Memory Express (NVMe) controller maintained at the server for the NVMe controller to provide access to the storage medium based, at least in part, on an association scheme that associates the S-Tag included in the RDMA command to the storage medium, the NVMe controller to associate the first portion of the given storage capacity with the storage medium based, at least in part, on the association scheme.

9. The method of claim 8, further comprising:
   receiving a command completion message from the NVMe controller and forwarding a status of completion of the RDMA command to the client based on the command completion message.

10. The method of claim 8, the RDMA command to access the storage medium includes one of a flush command, a write command, a read command, a write uncorrectable command or a compare command.

11. The method of claim 8, the association scheme comprising associating S-Tags to storage mediums based on one or more of a usage pattern for one or more previous client accesses to the plurality of storage mediums, a quality of service requirement associated with the client for access to the plurality of storage mediums, a load balancing scheme between the plurality of storage mediums, or a wear leveling between at least some of the plurality of storage mediums.

12. A method comprising:
   generating, at a Non-Volatile Memory Express (NVMe) controller maintained at a server, a memory mapping of one or more storage devices controlled by the NVMe controller to addresses for a base address register (BAR) accessible via a Peripheral Component Interconnect Express (PCIe) bus between the NVMe controller and a network input/output device coupled to the server;
   forwarding information associated with the memory mapping to a client remote to the server via the network input/output device;
   receiving a PCIe memory access command forwarded from the network input/output device and originating from the client, the PCIe memory access command for the client to have storage access to the one or more storage devices; and
   translating the PCIe memory access command based on the memory mapping to provide the client storage access to the one or more storage devices.

13. The method of claim 12, the PCIe memory access command received in a packet compatible with a RDMA protocol to include one of Internet Wide Area RDMA protocol (iWARP), Infinband or RDMA over Converged Ethernet (RoCE).

14. The method of claim 12, the PCIe memory access command to access the one or more storage devices to cause the NVMe controller to complete a storage command that includes one of a flush command, a write command, a read command, a write uncorrectable command or a compare command.

15. The method of claim 14, to provide the client storage access comprising the client to access a storage item to include one of a file, a directory or a block of storage, the NVMe controller to complete the storage command for the storage item.

16. The method of claim 12, the one or more storage devices to include at least one of a hard disk drive (HDD) or a solid state drive (SSD), the SSD having non-volatile memory comprising at least one of 3-dimensional crosspoint memory, flash memory, ferroelectric memory, silicon-oxide-nitride-oxide-silicon (SONGS) memory, polymer memory, nanowire, ferroelectric transistor random access memory (FeTRAM or FeRAM), nanowire or electrically erasable programmable read-only memory (EEPROM).

17. The method of claim 12, further comprising:

configuring a command cache to temporarily store a plurality of PCIe memory access commands originating from the client or from one or more other remote clients such that the NVMe controller is capable of meeting a PCIe transaction latency requirement when providing the client storage access to the one or more storage devices.

18. At least one non-transitory machine readable medium comprising a plurality of instructions that in response to being executed on a Non-Volatile Memory Express (NVMe) controller maintained at a server cause the NVMe controller to:

generate a memory mapping to one or more storage devices controlled by the NVMe controller to addresses for a base address register (BAR) accessible via a Peripheral Component Interconnect Express (PCIe) bus between the NVMe controller and a network input/output device coupled to the server;

forward information associated with the memory mapping to a client remote to the server via the network input/output device;

receive a PCIe memory access command forwarded from the network input/output device and originating from the client, the PCIe memory access command for the client to have storage access to the one or more storage devices; and translate the PCIe memory access command based on the memory mapping to provide the client storage access to the one or more storage devices.

19. The at least one non-transitory machine readable medium of claim 18, comprising the instructions to also cause the NVMe controller to:

configure a command cache to temporarily store a plurality of PCIe memory access commands originating from the client or from one or more other remote clients such that the NVMe controller is capable of meeting a PCIe transaction latency requirement when the client is provided storage access to the one or more storage devices.

20. The at least one non-transitory machine readable medium of claim 18, the network input/output device, the client and the NVMe controller arranged to operate in compliance with an industry standard to include PCIe Base Specification or NVMe Specification.

21. The at least one non-transitory machine readable medium of claim 18, the PCIe memory access command received in a packet compatible with a RDMA protocol to include one of Internet Wide Area RDMA protocol (iWARP), Infinband or RDMA over Converged Ethernet (RoCE).

22. The at least one non-transitory machine readable medium of claim 18, the PCIe memory access command to access the one or more storage devices to cause the NVMe controller to complete a storage command that includes one of a flush command, a write command, a read command, a write uncorrectable command or a compare command.

* * * * *